United States Patent
Kamon et al.

(10) Patent No.: US 8,013,918 B2
(45) Date of Patent: Sep. 6, 2011

(54) IMAGE CAPTURING APPARATUS INCLUDING AN IMAGE SENSOR HAVING THREE PHOTOELECTRIC CONVERSION CHARACTERISTICS WITH EACH CORRESPONDING TO A RANGE OF LUMINANCE INTENSITY

(75) Inventors: Koichi Kamon, Otokuni-gun (JP);
Tsuyoshi Iwamoto, Nishinomiya (JP);
Tomokazu Kakumoto, Yokohama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 693 days.

(21) Appl. No.: 11/717,882

(22) Filed: Mar. 14, 2007

(65) Prior Publication Data
US 2007/0216957 A1 Sep. 20, 2007

(30) Foreign Application Priority Data

Mar. 20, 2006 (JP) ................. 2006-076384

(51) Int. Cl.
*H04N 5/335* (2006.01)
(52) U.S. Cl. ........................................ 348/308
(58) Field of Classification Search .................. 348/308
See application file for complete search history.

(56) References Cited

U.S. PATENT DOCUMENTS

| | | | | |
|---|---|---|---|---|
| 6,977,685 | B1* | 12/2005 | Acosta-Serafini et al. ... | 348/308 |
| 7,525,579 | B2* | 4/2009 | Katagiri ....................... | 348/234 |
| 2004/0135913 | A1* | 7/2004 | Shinotsuka et al. .......... | 348/308 |
| 2004/0233313 | A1* | 11/2004 | Ando et al. .................. | 348/308 |
| 2005/0285959 | A1* | 12/2005 | Nakajima et al. ............ | 348/308 |
| 2006/0044436 | A1* | 3/2006 | Watanabe ..................... | 348/308 |
| 2006/0146161 | A1* | 7/2006 | Farrier ......................... | 348/308 |
| 2006/0181627 | A1* | 8/2006 | Farrier ......................... | 348/308 |
| 2006/0187314 | A1* | 8/2006 | Fujie et al. .................. | 348/222.1 |
| 2007/0273780 | A9* | 11/2007 | Shinotsuka ................... | 348/308 |
| 2008/0251695 | A1* | 10/2008 | Kamon ........................ | 250/208.1 |

FOREIGN PATENT DOCUMENTS

| | | |
|---|---|---|
| JP | 11-298798 A | 10/1999 |
| JP | 2002-77733 A | 3/2002 |
| JP | 2005-348005 A | 12/2005 |

OTHER PUBLICATIONS

"Nissan Motor Co. Ltd. achieves a first installing of a lane keeping support system into a new model of Cima in the world", http://www.nissan-global.com/GCC/Japan/NEWS/20001228_0.html:, Press Release of Nissan Motor Co., Ltd., Dec. 28, 2000, 1 pg.

* cited by examiner

*Primary Examiner* — Lin Ye
*Assistant Examiner* — Amy Hsu
(74) *Attorney, Agent, or Firm* — Sidley Austin LLP

(57) ABSTRACT

There is described an image capturing apparatus, which makes it possible to unify the gradation characteristics all over the captured image into the same characteristic. The image capturing apparatus includes an image sensor that is provided with a first photoelectric conversion characteristic, a second photoelectric conversion characteristic being different from the first photoelectric conversion characteristic and a third photoelectric conversion characteristic being a transient characteristic between the first photoelectric conversion characteristic and the second photoelectric conversion characteristic; and a characteristic converting section to convert the first photoelectric conversion characteristic, the second photoelectric conversion characteristic and the third photoelectric conversion characteristic to a reference photoelectric conversion characteristic. The first photoelectric conversion characteristic is a linear characteristic, the second photoelectric conversion characteristic is a logarithmic characteristic and the reference photoelectric conversion characteristic is either a linear or a logarithmic characteristic.

14 Claims, 27 Drawing Sheets

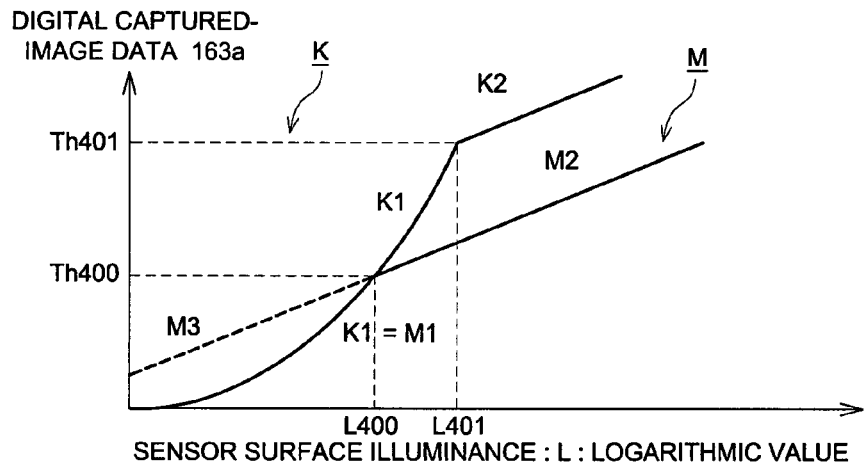
FIG. 13 (a) WHEN INFLECTION POINT IS CHANGED
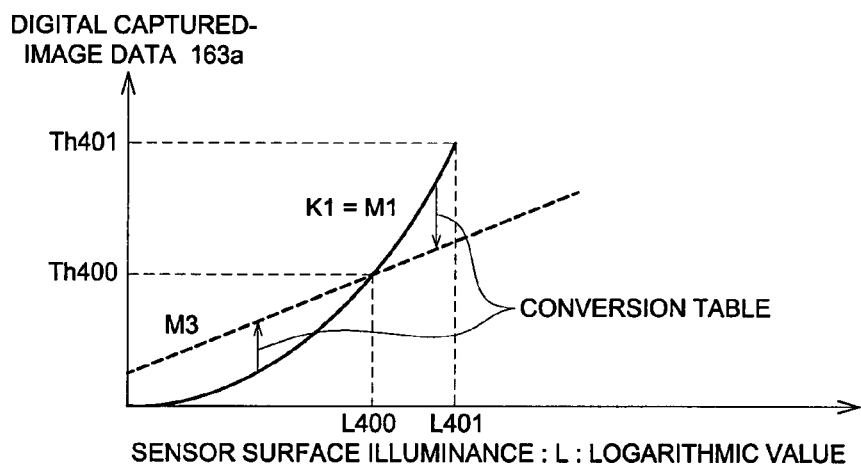
FIG. 13 (b) WHEN INFLECTION POINT IS CHANGED
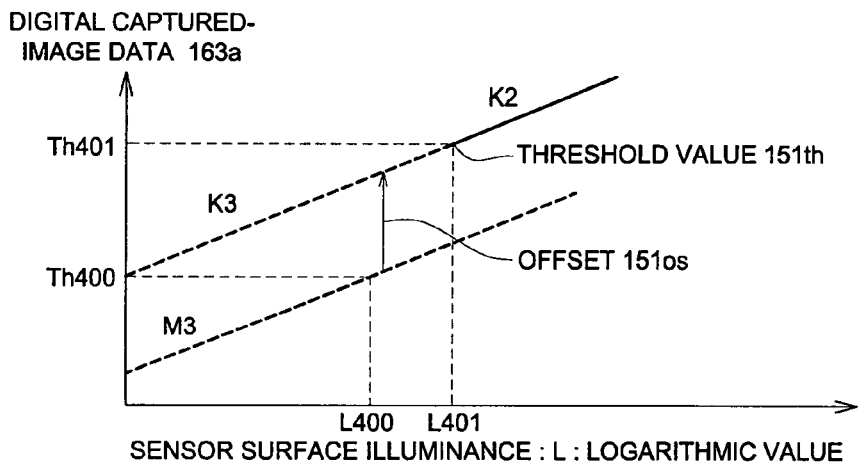
FIG. 13 (c) WHEN INFLECTION POINT IS CHANGED

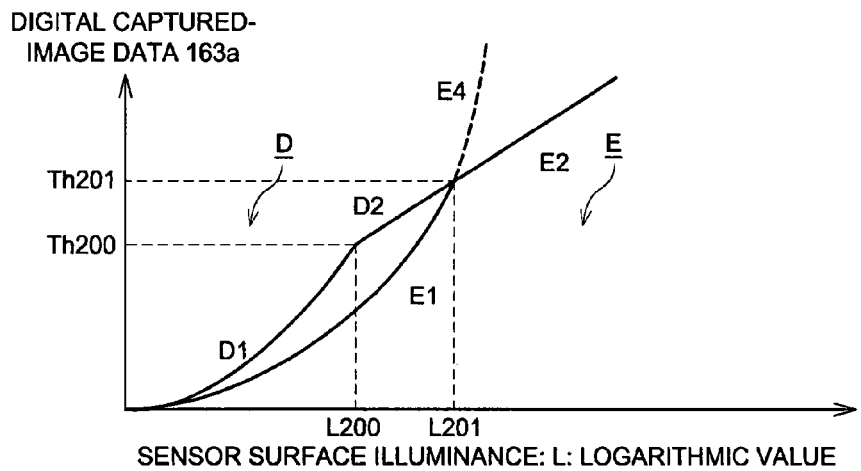
FIG. 16 (a) WHEN EXPOSURE TIME IS CHANGED
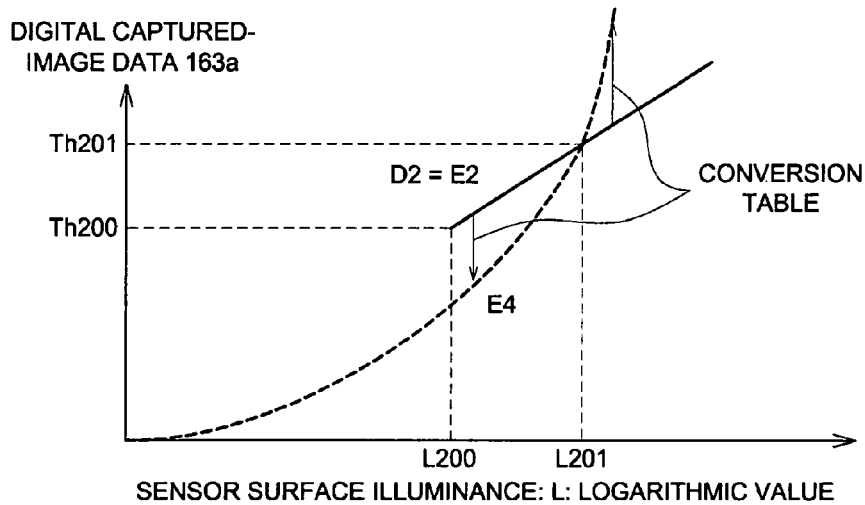
FIG. 16 (b) WHEN EXPOSURE TIME IS CHANGED
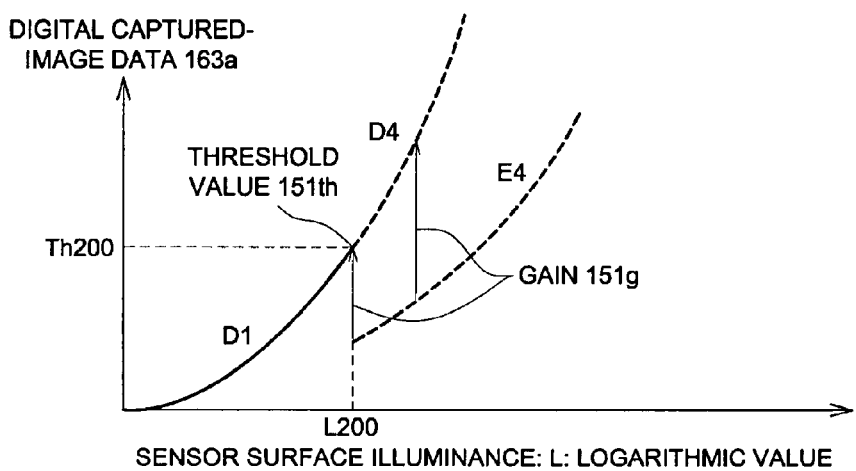
FIG. 16 (c) WHEN EXPOSURE TIME IS CHANGED

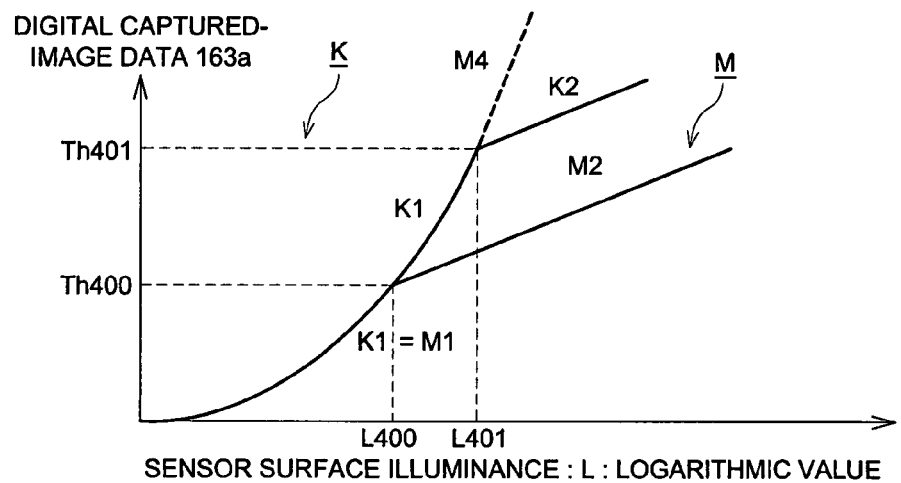
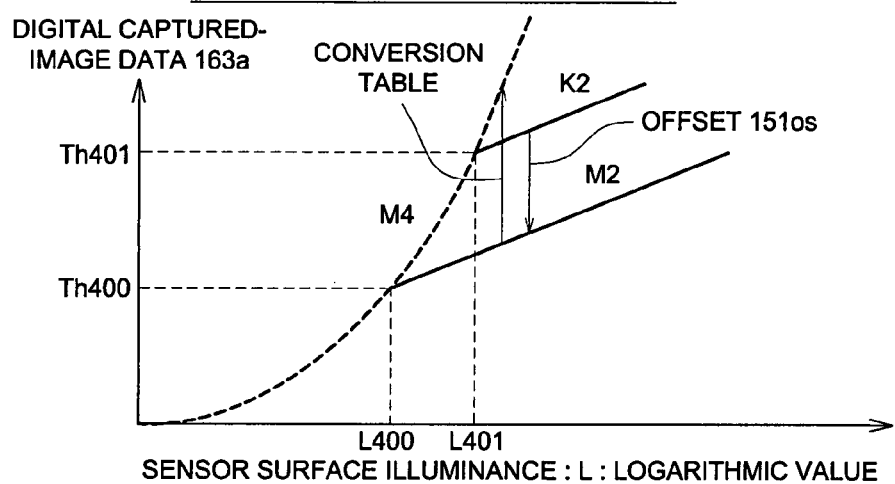
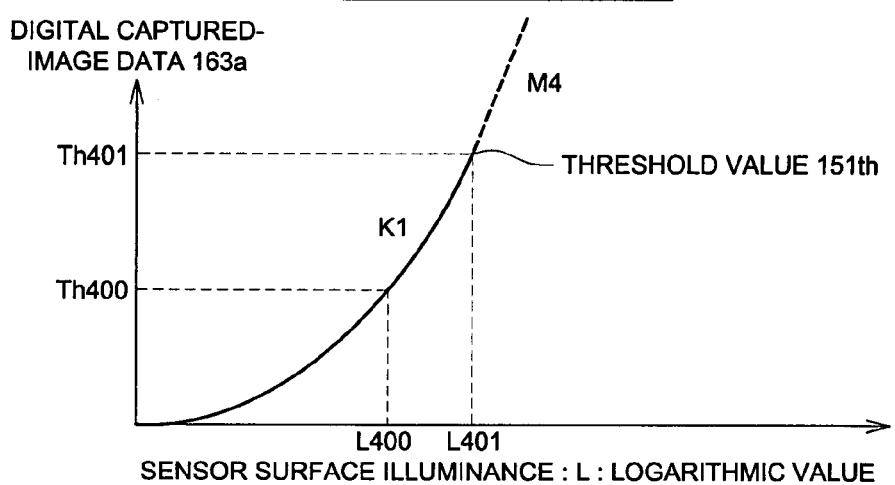

IMAGE CAPTURING APPARATUS INCLUDING AN IMAGE SENSOR HAVING THREE PHOTOELECTRIC CONVERSION CHARACTERISTICS WITH EACH CORRESPONDING TO A RANGE OF LUMINANCE INTENSITY

This application is based on Japanese Patent Application No. 2006-076384 filed on Mar. 20, 2006 with Japan Patent Office, the entire content of which is hereby incorporated by reference.

BACKGROUND OF THE INVENTION

The present invention relates to an image capturing apparatus, and specifically relates to an image capturing apparatus, which is provided with a image sensor having a first photo-electronic conversion characteristic, a second photo-electronic conversion characteristic being different from the first photo-electronic conversion characteristic and a third photo-electronic conversion characteristic exhibiting a transient characteristic between the first and second characteristics.

Recently, a car called an Advanced Safety Vehicle (hereinafter, referred to as the ASV, for simplicity), for which various safety measures are positively taken into account, have been developed in various kinds of technical fields. Among other things, measures for contributing the safety drive by employing images captured by an on-vehicle camera have been considered intensively (for instance, refer to Non Patent Document 1, Press Release of Nissan Motor Co. Ltd., titled "Nissan Motor Co. Ltd. achieves a first installing of a lane keeping support system into a new model of Cima in the world", http://www.nissan-global.com/GCC/Japan/NEWS/20001228_0.html: retrieved at Feb. 22, 2006).

Since it is required for the on-vehicle camera to capture such a subject that its luminance range is very wide and its luminance tends to abruptly fluctuate in such a range of environments from a direct sunshine to an inside of tunnel, the expansion of the luminance range sensible for the image sensor, namely, the expansion of the dynamic range of the image sensor, has been considered as one of the major subjects to be attained. Further, since a traveling speed of the vehicle is apt to become high, the captured images would stream at the normal frame rate (for instance, when the traveling speed of the vehicle is 100 Km/hour, the vehicle runs 93 cm during one frame period of a normal image capturing operation at 30 frames/second). Accordingly, to securely capture the subject concerned, it is required for the on-vehicle camera to conduct the image capturing operation at a high frame rate (for instance, to such an extent of 10 times of the normal frame rate).

To cope with the expansion of the dynamic range of the image sensor mentioned in the above, there has been well known the logarithmic conversion type image sensor (hereinafter, referred to as a logarithmic image sensor, for simplicity), which includes a solid-state image sensor constituted by photo-electronic conversion elements, such as photo diodes, etc., aligned in a matrix pattern and logarithmic conversion circuits, each provided with MOSFET (Metal Oxide Semiconductor Field Effect Transistor), etc., so as to logarithmically convert the intensity of incoming light to the output electric signals according to its established output characteristic, by using the sub-threshold characteristic of the MOSFET (for instance, set forth in Patent Document 1 (Tokkaihei 11-298798, Japanese Non-Examined Patent Publication)).

However, with respect to the logarithmic image sensor set forth in Patent Document 1 (Tokkaihei 11-298798), it exhibits considerable after-image when the illuminance on the image capturing surface changes from a high level to a low level, namely, the luminance of the subject changes from bright to dark. For instance, when capturing a moving image at night, a bright light, such as a headlight of a car, etc., leaves a long tail behind it as if a ghost light ball were flying in the black sky, resulting in difficulty of recognizing the image concerned.

To overcome the abovementioned drawback, Patent Document 2 (Tokkai 2002-77733, Japanese Non-Examined Patent Publication), for instance, sets forth the linear-logarithmic conversion type image sensor (hereinafter, referred to as a linear-logarithmic image sensor, for simplicity) that makes it possible to automatically change the output characteristic inherent to the solid-state image sensor, namely, the linear operating state in which intensities of the incoming light are linearly converted to the output electric signals, and the logarithmic operating state mentioned in the above, to each other (hereinafter, referred to as a linear-logarithmic characteristic, for simplicity). According to the linear-logarithmic image sensor mentioned in the above, since the aforementioned problem in regard to the after-image can be solved, it becomes possible to improve the sensitivity of the image sensor in the low illuminance region, and as a result, it becomes possible to conduct the image capturing operation at a high frame rate.

On the other hand, in the ASV, the images captured by the on-vehicle camera are image-processed, for instance, to extract a car, an obstruction material, etc. being currently running in front of the vehicle concerned, in order to secure the safety drive. In such the case, since it takes much time to image-process the images captured by the aforementioned linear-logarithmic image sensor, in which the linear characteristic portions and the logarithmic characteristic portions are mixed with each other, due to the complexities of the image-processing operations, the linear-logarithmic image sensor is not suitable for the high-speed image-processing operations required to be conducted in the on-vehicle camera, as it is.

To cope with the abovementioned problem, with respect to the image capturing apparatus provided with the linear-logarithmic image sensor, for instance, Patent Document 3 (FIG. 11 of Tokkai 2005-348005, Japanese Non-Examined Patent Publication) sets forth the method for making the gradation characteristic over the concerned image uniform (or the same characteristic) by applying the gradation conversion processing corresponding to the linear characteristic region, and the logarithmic characteristic region to the image data representing the image concerned.

In the descriptions of Patent Document 3 (Tokkai 2005-348005), as shown in FIG. 11 of Patent Document 3, it is assumed that the linear characteristic region and the logarithmic characteristic region are completely changed to each other at the changeover point between the linear characteristic region and the logarithmic characteristic region (hereinafter, referred to as an inflection point). In reality, however, there is a region exhibiting a transient characteristic being an intermediate characteristic between the linear and logarithmic characteristics (hereinafter, referred to as a T-Log region) in the border region between them. In the normal operating condition, since the T-Log region is too narrow to take it as a problem, no problem would arise even if it is assumed that the linear characteristic region and the logarithmic characteristic region completely shift to each other at the inflection point. However, as detailed later referring to FIG. 22 through FIG. 26 of the present invention, for instance, when the image capturing operation at the high frame rate required for the on-vehicle camera should be conducted, or, for instance, when the linear characteristic region is wide in such the case that the inflection point is set at a high point of the output characteristic of the image sensor, the T-Log region is widened and it becomes necessary to conduct the gradation conversion processing for the T-Log region, which is neither linear characteristic nor logarithmic characteristic.

SUMMARY OF THE INVENTION

To overcome the abovementioned drawbacks in conventional image capturing apparatus, it is one of objects of the present invention to provide an image capturing apparatus, which includes an image sensor that is provided with a first photoelectric conversion characteristic, a second photoelectric conversion characteristic being different from the first photoelectric conversion characteristic and a third photoelectric conversion characteristic being a transient characteristic between the first photoelectric conversion characteristic and the second photoelectric conversion characteristic, and which makes it possible to unify the gradation characteristics all over the captured image into the same characteristic.

Accordingly, at least one of the objects of the present invention can be attained by the image capturing apparatus described as follow.

(1) According to an aspect of the present invention, an image capturing apparatus, comprises: an image sensor that is provided with a first photoelectric conversion characteristic, a second photoelectric conversion characteristic being different from the first photoelectric conversion characteristic and a third photoelectric conversion characteristic being a transient characteristic between the first photoelectric conversion characteristic and the second photoelectric conversion characteristic; and a characteristic converting section to convert the first photoelectric conversion characteristic, the second photoelectric conversion characteristic and the third photoelectric conversion characteristic to a reference photoelectric conversion characteristic.

(2) According to another aspect of the present invention, in the image capturing apparatus recited in item 1, the first photoelectric conversion characteristic is a linear characteristic, while the second photoelectric conversion characteristic is a logarithmic characteristic.

(3) According to another aspect of the present invention, in the image capturing apparatus recited in item 2, the reference photoelectric conversion characteristic is a linear characteristic.

(4) According to still another aspect of the present invention, in the image capturing apparatus recited in item 2, the reference photoelectric conversion characteristic is a logarithmic characteristic.

(5) According to still another aspect of the present invention, in the image capturing apparatus recited in item 1, the characteristic converting section converts the third photoelectric conversion characteristic to the reference photoelectric conversion characteristic by employing a method being different from another method for converting the first photoelectric conversion characteristic and the second photoelectric conversion characteristic to the reference photoelectric conversion characteristic.

(6) According to still another aspect of the present invention, in the image capturing apparatus recited in item 1, the characteristic converting section converts the third photoelectric conversion characteristic to the reference photoelectric conversion characteristic, while regarding each of characteristic regions, into which the third photoelectric conversion characteristic is divided at a changeover point, as either the first photoelectric conversion characteristic or the second photoelectric conversion characteristic.

(7) According to still another aspect of the present invention, in the image capturing apparatus recited in item 5, the changeover point is defined as an intersection of extended lines of the first photoelectric conversion characteristic and the second photoelectric conversion characteristic.

(8) According to still another aspect of the present invention, in the image capturing apparatus recited in item 1, the characteristic converting section is provided with a look up table including a memory section.

(9) According to still another aspect of the present invention, in the image capturing apparatus recited in item 2, a boundary between the first photoelectric conversion characteristic and the third photoelectric conversion characteristic is set at such a point that is apart from another point, represented by an equation of the first photoelectric conversion characteristic, by a first value being equal to or greater than a first predetermined value, while a boundary between the second photoelectric conversion characteristic and the third photoelectric conversion characteristic is set at such a point that is apart from another point, represented by an equation of the second photoelectric conversion characteristic, by a second value being equal to or greater than a second predetermined value.

(10) According to still another aspect of the present invention, in the image capturing apparatus recited in item 9, the first predetermined value is determined prior to the second predetermined value.

(11) According to yet another aspect of the present invention, in the image capturing apparatus recited in item 9, wherein the second predetermined value is smaller than the first predetermined value.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 13(a), FIG. 13(b) and FIG. 13(c) are explanatory drawings for explaining a method for establishing parameters when a level of an inflection point is changed;

FIG. 16(a), FIG. 16(b) and FIG. 16(c) are explanatory drawings for explaining a method for establishing parameters when sn exposure time is changed;

FIG. 17(a), FIG. 17(b) and FIG. 17(c) are explanatory drawings for explaining a method for establishing parameters when a level of an inflection point is changed;

DETAILED DESCRIPTION OF THE PREFERRED EMBODIMENT

Figure 1:
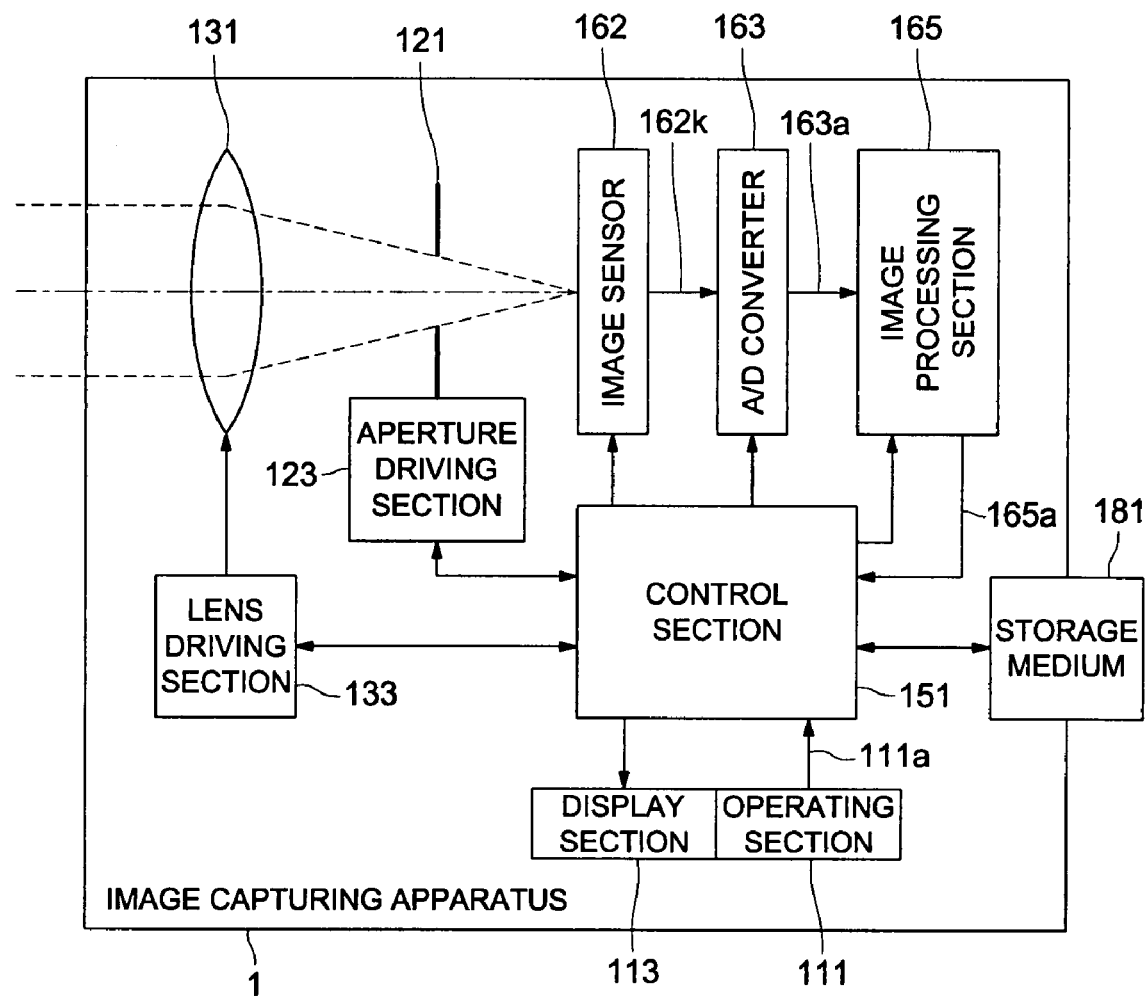
FIG. 1 shows a block diagram of an internal configuration of an image capturing apparatus.

Referring to the drawings, the embodiment of the present invention will be detailed in the following. Incidentally, the same reference number will be attached to the same elements in the drawings, and duplicated explanations will be omitted.

Initially, referring to FIG. 22 through FIG. 26, the subject to be solved by the present invention will be detailed in the following.

Figure 22:
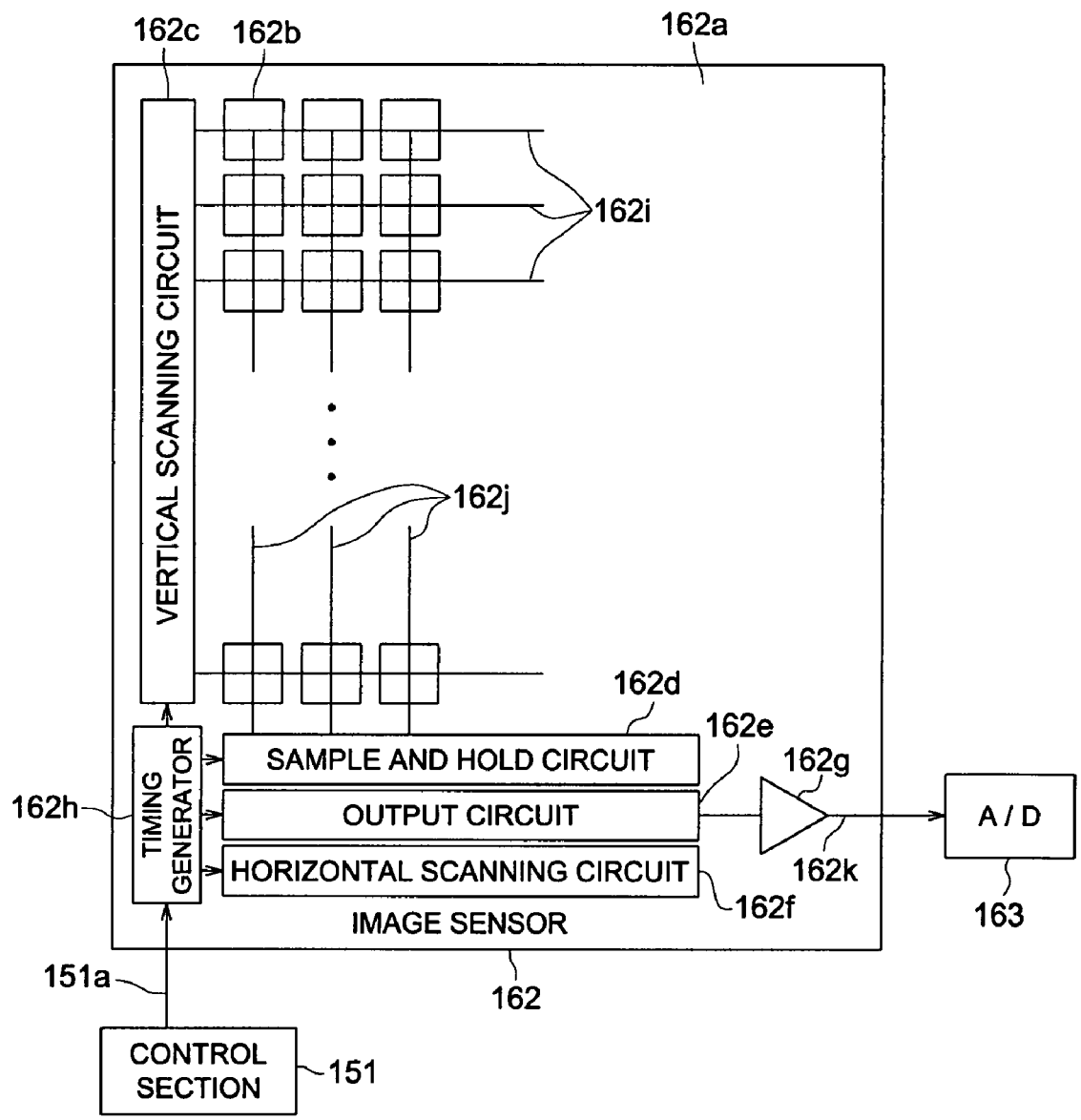
FIG. 22 shows a schematic diagram indicating an exemplified configuration of structural elements constituting an image sensor.

FIG. 22 shows a schematic diagram indicating an exemplified configuration of the structural elements constituting an image sensor. In the present embodiment, a CMOS (Complimentary Metal Oxide Semiconductor) type imager is employed as the image sensor.

A image sensor 162 is provided with structural elements, such as a plurality of pixel cells 162b, a vertical scanning circuit 162c, a sample and hold circuit 162d, an output circuit 162e, a horizontal scanning circuit 162f, an output amplifier 162g, a timing generator 162h, etc. Further, each horizontal array line of the plurality of pixel cells 162b is coupled to the vertical scanning circuit 162c through each of a plurality of line selecting wires 162i, while each vertical array line of the plurality of pixel cells 162b is coupled to the sample and hold circuit 162d through each of a plurality of vertical signal wires 162j.

In response to image capturing control signals 151a sent from a control section 151, the timing generator 162h controls image capturing operations to be conducted in the image sensor 162. Further, captured image data 162k, serving as the output signals of the image sensor 162, are inputted into an analogue-to-digital converter 163 (hereinafter, an A/D converter 163). The image capturing operations will be detailed later, referring to FIG. 24.

Figure 23:
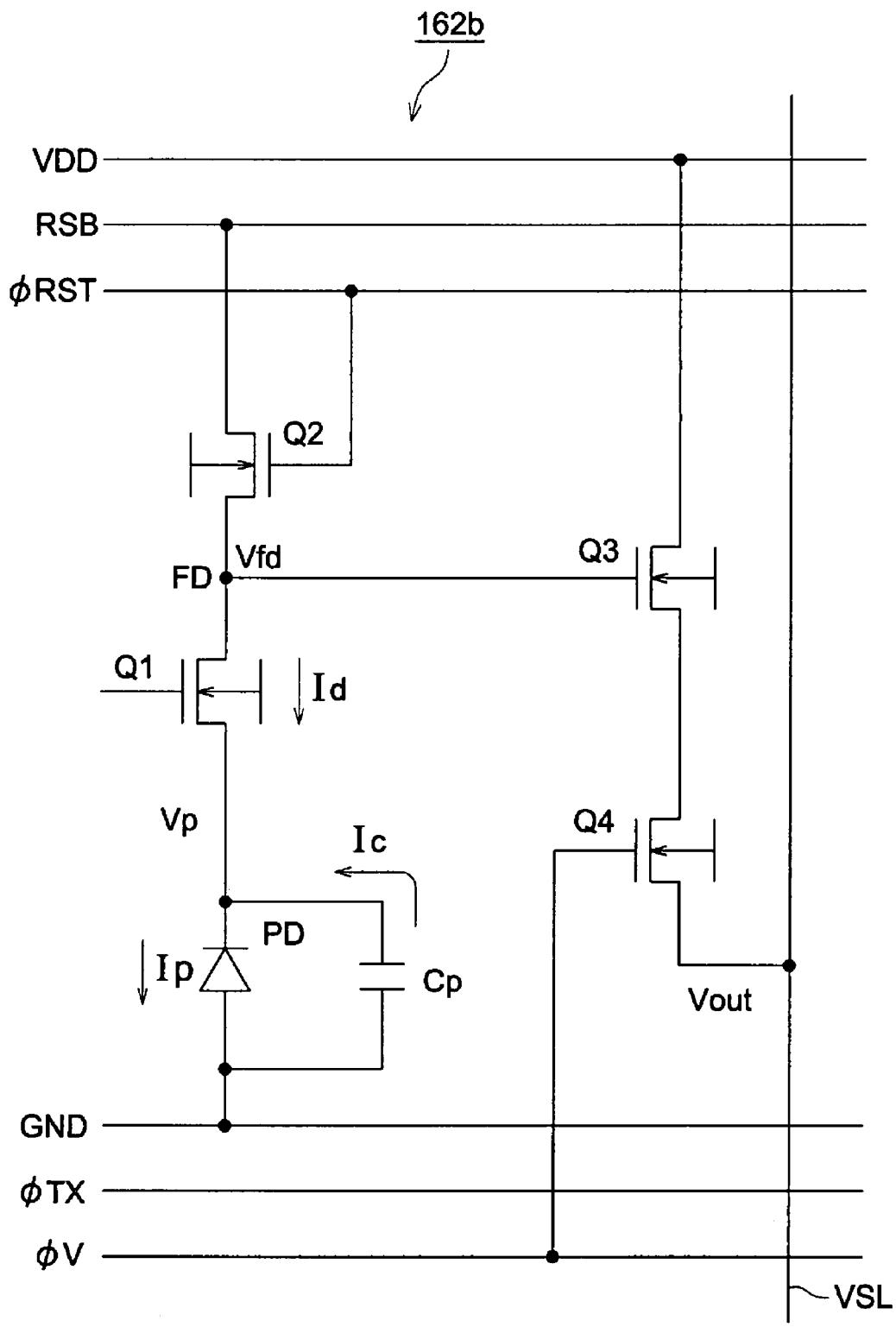
FIG. 23 shows a circuit diagram of one of the plurality of pixel cells included in an image sensor embodied in the present invention as the first embodiment.

FIG. 23 shows a circuit diagram of one of the plurality of pixel cells 162b (hereinafter, also referred to as a pixel cell 162b, for simplicity) having two different photo-electronic conversion characteristics, namely, the linear characteristic region and the logarithmic characteristic region, and which included in the image sensor 162 embodied in the present invention as the first embodiment.

The pixel cell 162b is constituted by an embedded-type photodiode PD (hereinafter, also referred to as a PD section) and N-channel MOSFETs (Metal Oxide Semiconductor Field Effect Transistor) Q1, Q2, Q3, Q4 (hereinafter, referred to as Transistors Q1, Q2, Q3, Q4, for simplicity). The connecting section of a drain of the Transistor Q1 and a source of Transistor Q2 is formed as a floating diffusion section FD (hereinafter, referred to as a FD section). A reset signal φRST, a transfer signal φTX and a reading signal φV indicate control signals for each of Transistors Q1, Q2, Q3, Q4, while a symbol VDD, a symbol GND and a symbol RSB indicate a electric power source, a ground and a reset voltage at the FD section, respectively.

In the PD section, an anode and a cathode of the embedded-type photodiode PD are coupled to the GND and a source of Transistor Q1, respectively. The PD section serves as the photo-electric conversion section, so as to generate a photoelectric current Ip corresponding to an intensity of light coming from the subject, and to accumulate the photoelectric current Ip, serving as a flow of photoelectric charge Qp, into a parasitic capacitor Cp existing in the PD section.

The source, drain and gate of the Transistor Q1, which is called the transfer gate, are coupled to the cathode of the PD section, the connecting point of a source of the Transistor Q2 and a gate of the Transistor Q3, namely FD section, and the transfer signal φTX, respectively. In the abovementioned configuration, by setting the gate voltage of the Transistor Q1 at an intermediate voltage VM, the photoelectric current Ip in the PD section is photo-electrically converted according to the linear-logarithmic characteristic, and then, by setting the gate voltage of the Transistors Q1 at an high voltage VH, the photoelectric charge Qp, stored in the parasitic capacitor Cp of the PD section, is completely transferred to the FD section.

The FD section serves as a capacitive reading section for reading the photoelectric charge Qp, which is accumulated into the parasitic capacitor Cp and completely transferred to the FD section having a capacitance Cfd.

The drain, source and gate of the Transistor Q2, which is called the reset gate, are coupled to the reset voltage RSB, the FD section and the reset signal φRST, respectively. By setting the gate voltage of the Transistors Q1 at the electric power source voltage VDD, the voltage of the FD section is reset to the reset voltage RSB.

The drain, source and gate of the Transistor Q3, which serves as a source-follower current amplifier circuit, are coupled to the electric power source voltage VDD, the drain of the Transistors Q4 and the FD section, respectively. By conducting the current amplifying operation based on the voltage Vfd of the FD section, the Transistor Q3 lowers the output impedance of the voltage Vfd.

The drain, source and gate of the Transistor Q4, which serves as a readout transistor, are coupled to the source of the Transistor Q3, the vertical signal line VSL and the reading signal φV, respectively. By setting the gate voltage of the Transistors Q4 at the electric power source voltage VDD, the Transistor Q4 lowers the output impedance of the voltage Vfd of the FD section through the Transistor Q3 so as to output the voltage Vfd onto the vertical signal line VSL as a pixel output voltage Vout.

Figure 24:
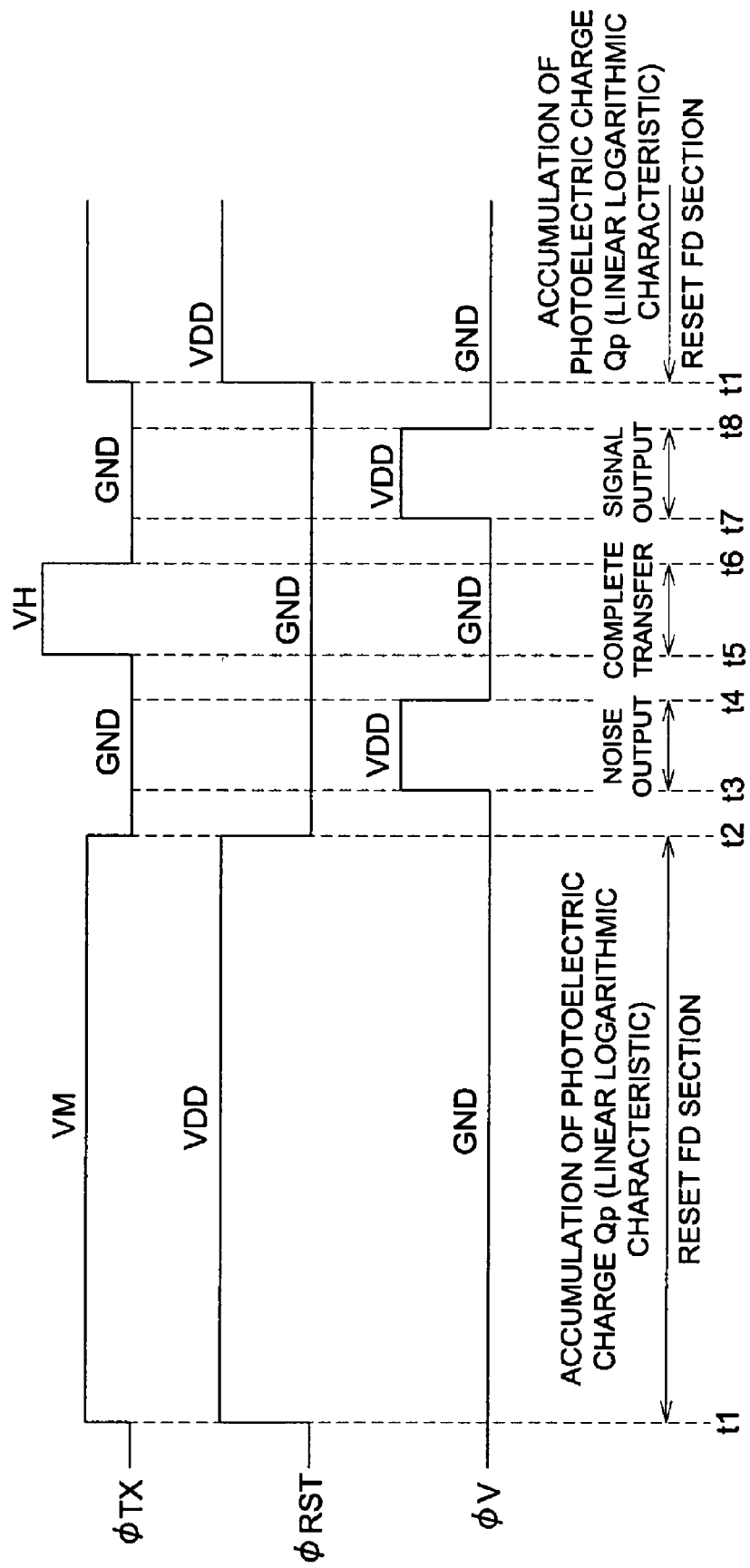
FIG. 24 shows a timing chart of internal operations of the plurality of pixel cells shown in FIG. 23, when driving them in a rolling shutter method.
Figure 25:
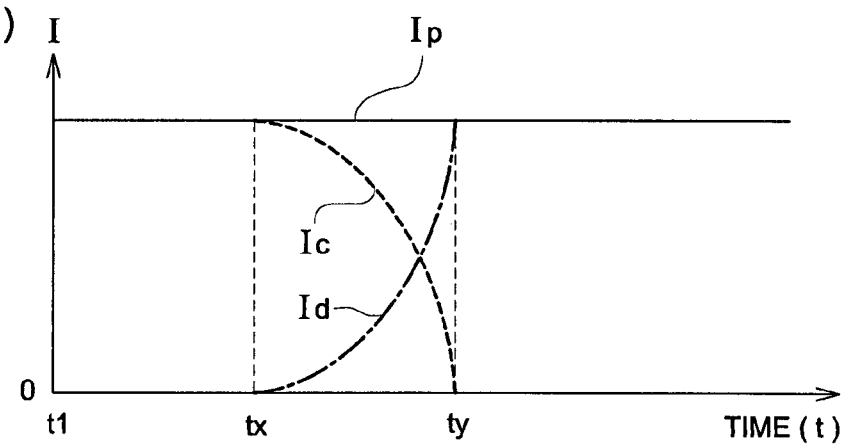
FIG. 25(a) and FIG. 25(b) show graphs of the photoelectric conversion characteristic in the time domain.
Figure 25:
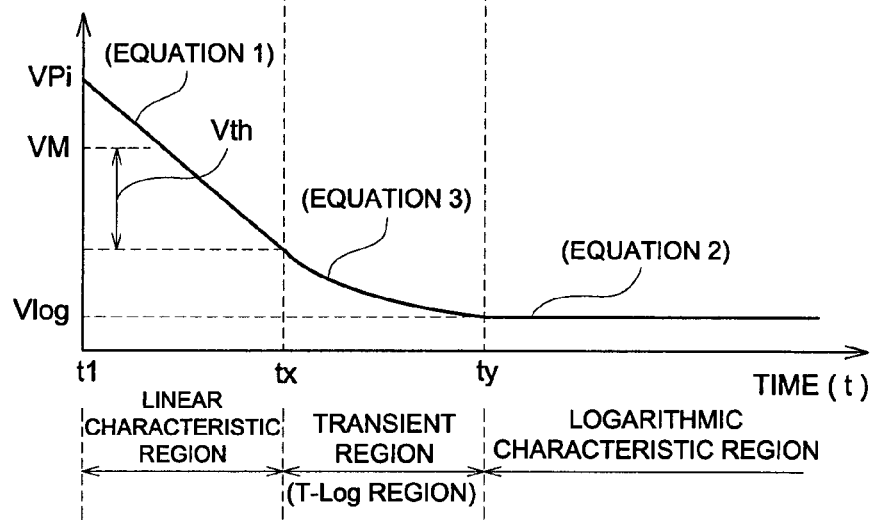

FIG. 24 shows a timing chart of internal operations of the plurality of pixel cells 162b shown in FIG. 23, when driving them in the rolling shutter method, which is a typical method for driving a CMOS type image sensor of general purpose.

At first, during a time interval from time t1 to time t2, the voltage of the FD section is reset to the reset voltage RSB, by setting the reset signal φRST at the electric power source voltage VDD. At the same time, by setting the transfer signal φTX at the intermediate voltage VM, the Transistor Q1 enters into the linear logarithmic operating mode, so that the photoelectric current Ip photo-electrically converted in the PD section is converted into the linear-logarithmic characteristic and the photoelectric charge Qp is accumulated into the parasitic capacitor Cp of the PD section during the time interval from time t1 to time t2. At time t2, both the reset signal φRST and the transfer signal φTX are set at the ground voltage GND to finalize the initializing operation of the FD section. The time interval from time t1 to time t2 is a so-called exposure time.

During a time interval from time t3 to time t4, by setting the reading signal φV at the electric power source voltage VDD, a voltage Vfd of the FD section in the initialized state is outputted onto the vertical signal line VSL through the Transistors Q3, Q4, as a reset noise signal Vn. During a time interval from time t5 to time t6, by setting the transfer signal φTX at the high voltage VH, the photoelectric charge Qp stored in the parasitic capacitor Cp of the PD section is completely transferred into the FD section, and, at the same time, the electric charge stored in the PD section becomes zero, resulting in an initialization of the PD section.

During a time interval from time t7 to time t8, by setting the reading signal φV at the electric power source voltage VDD, a voltage Vfd generated by the photoelectric charge Qp transferred into the FD section is outputted onto the vertical signal line VSL through the Transistors Q3, Q4, as a photoelectric conversion signal Vs. Both the reset noise signal Vn and the photoelectric conversion signal Vs outputted onto the vertical signal line VSL are differentiated from each other by the sample and hold circuit 162d shown in FIG. 22, so as to generate a pixel signal Vpx (namely, Vpx=Vs−Vn).

In response to the horizontal scanning signal (not shown in the drawings) outputted from the horizontal scanning circuit 162f shown in FIG. 22, a plurality of pixel signals Vpx equivalent to one horizontal line are outputted to the A/D converter 163 through the output circuit 162e and the output amplifier 162g as one horizontal line image data 162k. The abovementioned operation is repeated for every horizontal pixel line, while shifting a timing of each operation.

In the linear-logarithmic image sensor, the photoelectric conversion characteristic can be roughly divided into the linear characteristic region and the logarithmic characteristic region. However, at a section for connecting the linear characteristic region and the logarithmic characteristic region with each other, there exists a region, which is neither the linear characteristic region nor the logarithmic characteristic region (namely, which exhibits a transient characteristic being an intermediate characteristic between both of them). Next, such the region will be detailed in the following.

During the time interval from time t1 to time t2, the Transistor Q1 is in a cut-off state, until the voltage of the PD section reaches to an electric potential, which is lower than the electric potential value, set by the equation of "gate voltage of Transistor Q1=transfer signal φTX=intermediate voltage VM", by a threshold voltage Vth of the Transistor Q1. Accordingly, since all of the photoelectric current Ip is accumulated into the parasitic capacitor Cp, the photoelectric conversion characteristic in this region exhibits a linear characteristic defined by the Equation 1 indicated as follow.

$$Vp = Vpi - \frac{Ip \cdot t}{C} \quad \text{(Equation 1)}$$

where
t: accumulation time of photoelectric current IP
Vpi: initialized voltage of PD section during the time interval from time t5 to time t6 (determined depending on high voltage VH of transfer signal φTX).

When the action of accumulating the photoelectric current Ip progresses to such a extent that the voltage of the PD section reaches to an electric potential, which is lower than the electric potential value, set by the equation of "gate voltage of Transistor Q1=transfer signal φTX=intermediate voltage VM", by a threshold voltage Vth of the Transistor Q1, the Transistor Q1 enters into the sub-threshold state, and an electric current Id begins to flow into the Transistor Q1. When the photoelectric current Ip and the electric current Id of the Transistor Q1 are evenly balanced with each other, the photoelectric conversion characteristic in this region exhibits a logarithmic characteristic defined by the Equation 2 indicated as follow.

$$Vp = VM - Vth - \frac{nkT}{q} \ln \frac{I_p}{I_{DO}} \quad \text{(Equation 2)}$$

where n: value determined by gate insulation film capacitance and depletion layer capacitance, k: Boltzmann constant, T: absolute temperature, q: elementary electric charge Ido: constant determined depending on size of Transistor Q1.

A part of the photoelectric conversion characteristic emerging during the time interval, from the time when the electric current Id begins to flow into the Transistor Q1 to the time when the photoelectric current Ip and the electric current Id of the Transistor Q1 are evenly balanced with each other, is defined as the T-Log region mentioned in the foregoing. In the T-Log region, the electric potential voltage Vp of the PD section is determined by a differential electric current component Ic (Ic=Ip−Id) between the electric current Id of the Transistor Q1 for charging the parasitic capacitor Cp and the photoelectric current Ip for discharging the parasitic capacitor Cp. At the time when the electric current Id begins to flow into the Transistor Q1, since the photoelectric current Ip is sufficiently greater than the electric current Id of the Transistor Q1, the differential electric current component Ic is nearly equal to the photoelectric current Ip, and therefore, the electric potential voltage Vp of the PD section exhibits substantially a linear characteristic. Since the electric current Id of the Transistor Q1 logarithmically increases according as the discharging action of the parasitic capacitor Cp progresses, the linear characteristic of the electric potential voltage Vp of the PD section gradually deteriorates in its linearity, and smoothly shifted to a logarithmic characteristic.

The photoelectric conversion characteristic in the T-Log region can be represented by the equation in respect to the time response when the photoelectric current abruptly changes in the logarithmic conversion characteristic. The equation is indicated as follow.

$$Vp = \frac{nkT}{q} \cdot \ln \left\{ I_{DO} e^{\frac{q}{nkT}(VM-Vth)} \left[ \left( \frac{1}{I_i} - \frac{1}{I_p} \right) e^{-\frac{q}{nkTC} I_p \cdot t} + \frac{1}{I_p} \right] \right\} \quad \text{(Equation 3)}$$

where Ii: photoelectric current at the time when electric current Id begins to flow.

FIG. 25(b) shows a graph of the photoelectric conversion characteristic expressed by the Equations 1-3 mentioned in the above. FIG. 25(a) and FIG. 25(b) show graphs of the photoelectric conversion characteristic in the time domain, and specifically, FIG. 25(a) shows a relationship between the photoelectric current Ip, the electric current Id of the Transistor Q1 and the differential electric current component Ic of the parasitic capacitor Cp, wherein the horizontal axis represents time "t", while the vertical axis represents electric current I. Further, in FIG. 25(b), the horizontal axis represents time "t", while the vertical axis represents voltage Vp of the PD section.

As shown in FIG. 25(a), the electric current Id of the Transistor Q1, indicated by the alternate long and short dash line, is nearly zero with respect to the photoelectric current Ip of the PD section, indicated by the solid line, at the time t1 shown in FIG. 24, while the differential electric current component Ic of the parasitic capacitor Cp, indicated by the broken line, is nearly equal to the photoelectric current Ip of the PD section. Accordingly, as shown in FIG. 25(b), the electric potential voltage Vp of the PD section linearly decreases from the initial value of voltage Vpi at the time t1 (namely, exhibiting a linear characteristic), in such a manner that the linear characteristic of the voltage Vp is kept by a time tx when the voltage Vp of the PD section reaches to the electric potential, which is lower than the intermediate voltage VM by the threshold voltage Vth of the Transistor Q1. After the time tx, as shown in FIG. 25(a), the electric current Id of the Transistor Q1 logarithmically increases, while the differential electric current component Ic of the parasitic capacitor Cp logarithmically decreases.

Accordingly, as shown in FIG. 25(b), the inclination angle of the voltage Vp of the PD section versus horizontal line gradually decreases from that of the linear characteristic according to the Equation 3, and finally, becomes zero at time ty when the electric current Id of the Transistor Q1 becomes equal to the photoelectric current Ip. After the time ty, the voltage Vp of the PD section enters into the logarithmic characteristic expressed by the Equation 2, and exhibits the constant value Vlog.

Figure 26:
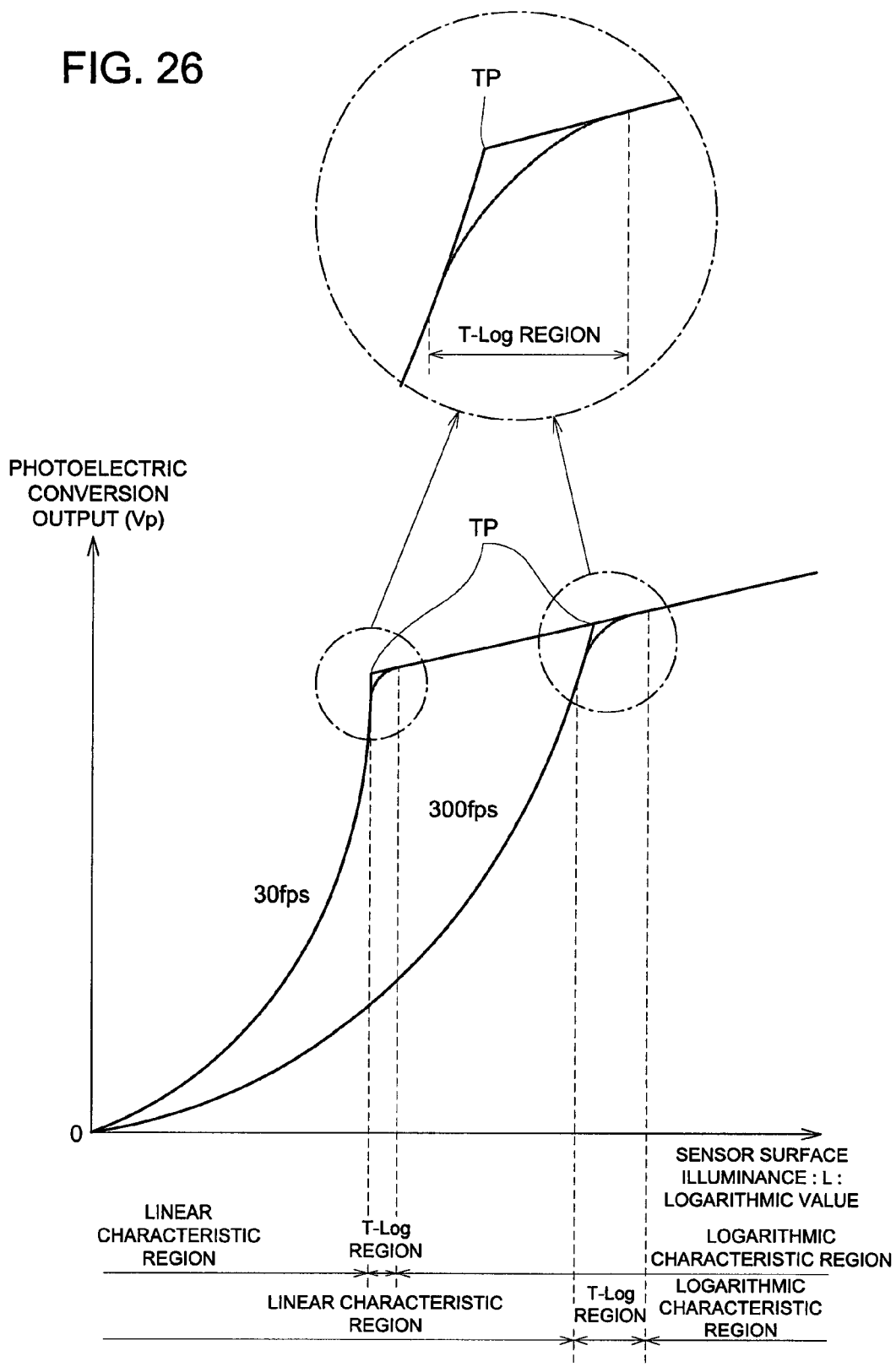
FIG. 26 shows a graph indicating two photoelectric conversion characteristics with respect to two different frame rates.

FIG. 26 shows a graph indicating two photoelectric conversion characteristics with respect to two different frame rates, wherein the horizontal axis represents logarithmic values of sensor surface illuminance L of the plurality of pixel cells 162b, while the vertical axis represents the photoelectric conversion output, namely, differential components from the initial value Vpi of the voltage Vp of the PD section in a polarity reverse to that shown in FIG. 25(b).

As shown in FIG. 26, in the normal frame rate, for instance, 30 frames/sec., the photoelectric conversion characteristic raises from the low illuminance side with the linear characteristic, and then, changes to the logarithmic characteristic at an inflection point TP. As shown in the macrograph indicated within the alternate long and short dash circle line, even in the case of the normal frame rate, the T-Log region, in which the linear characteristic smoothly shifts to the logarithmic characteristic, exists in the vicinity of the inflection point TP. However, in such the case, the T-Log region is normally negligible, since it is too narrow.

On the contrary, in the high frame rate, for instance, 300 frames/sec., since the time interval for accumulating the photoelectric current Ip of the PD section is getting short to an extent of ⅒ of that in the normal frame rate, the linear characteristic region is widened, and accordingly, the inflection point TP is shifted to a higher point of the sensor surface illuminance L, compared to that in the normal frame rate. Therefore, since the photoelectric current Ip of the PD section increases, compared to that in the normal frame rate, and is getting large at the time tx shown in FIG. 25, namely, when the electric current Id of the Transistor Q1 begins to flow, the T-Log region becomes wider than that in the normal frame rate.

In the abovementioned case, since a portion of the photographed image captured with the T-Log characteristic is getting large, and, if the gradation conversion processing only suitable for either the linear characteristic or the logarithmic characteristic is applied to the T-Log region, erroneous image processing would be applied to the T-Log region, it becomes impossible to neglect the existence of the T-Log region. The detailed in the foregoing is the subject to be solved by the present invention.

Figure 27A:
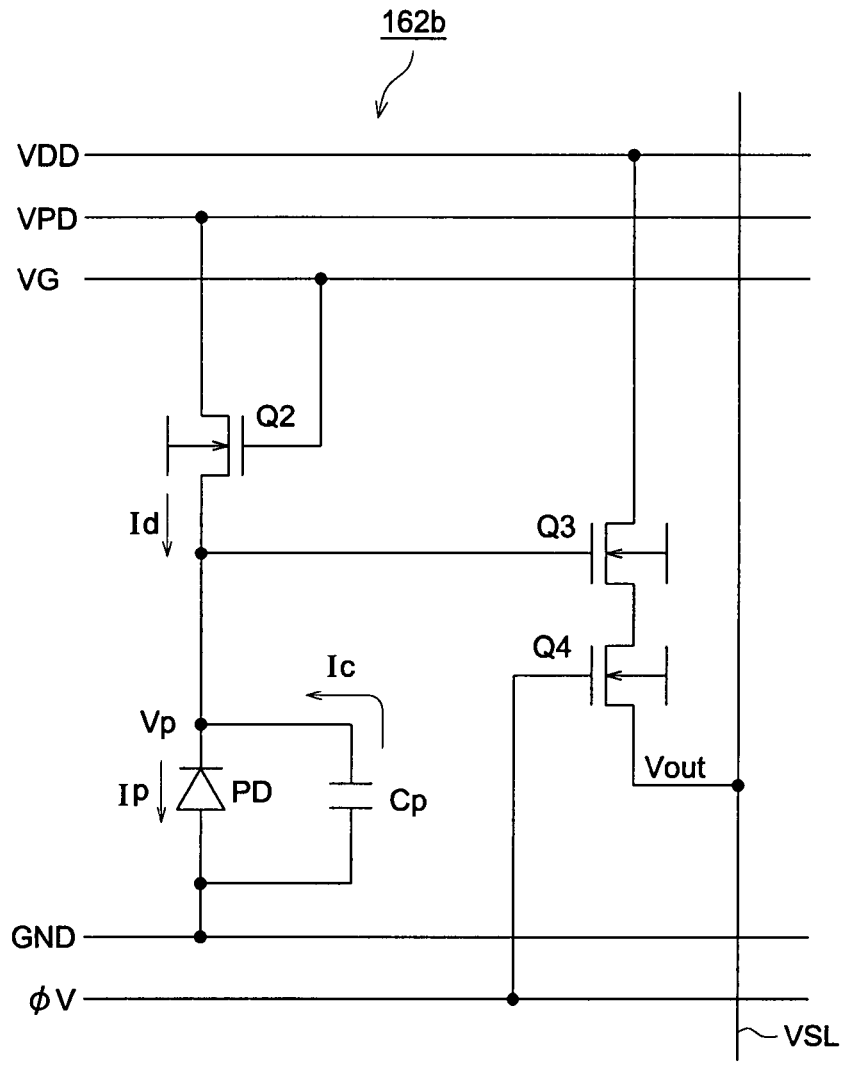
FIGS. 27(a) and FIG. 27 (b) show a circuit diagram of one of the plurality of pixel cells included in an image sensor embodied in the present invention as the second embodiment.
Figure 27B:
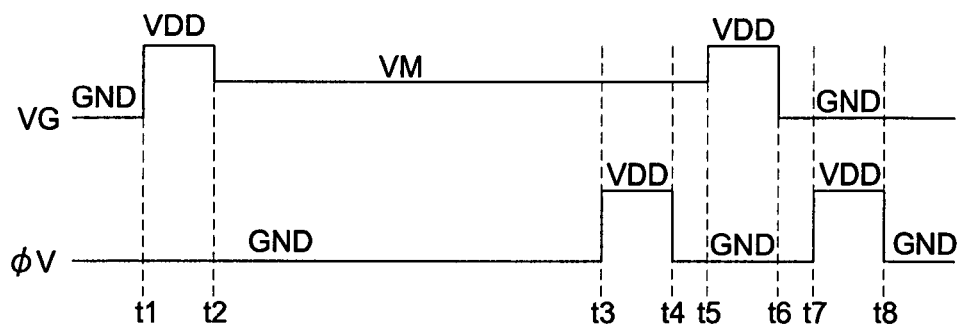

Further, referring to FIG. 27(a) and FIG. 27(b), the image sensor 162 embodied in the present invention will be detailed in the following as the second embodiment. FIG. 27(a) shows a circuit diagram of one of the plurality of pixel cells 162b of the second embodiment, while FIG. 27(b) shows a timing chart for indicating a method for driving the pixel cell 162b.

The configuration of the pixel cell 162b shown in FIG. 27(a) is substantially the same as that shown in FIG. 23, except that the Transistor Q1 is excluded from the configuration. In the circuit diagram shown in FIG. 27(a), the Transistor Q2 has two roles of both Transistor Q1 and Transistor Q2 shown in FIG. 23. In the configuration shown in FIG. 27(b), at first, during a time interval from time t1 to time t2, the voltage of the PD section is reset (initialization) by setting the gate voltage VG at the electric power source voltage VDD. Then, at time t2, by setting the gate voltage VG at the intermediate voltage VM, the photoelectric current Ip of the PD section enters into the linear logarithmic converting state in which the photoelectric current Ip is converted to the linear-logarithmic characteristic, and, during a time interval from time t2 to time t3, the photoelectric charge Qp is accumulated into the parasitic capacitor Cp with the linear-logarithmic characteristic.

During a time interval from time t3 to time t4, by setting the reading signal φV at the electric power source voltage VDD, a voltage Vp of the PD section is outputted onto the vertical signal line VSL through the Transistors Q3, Q4, as a photoelectric conversion signal Vs. Then, during a time interval from time t5 to time t6, by again setting the gate voltage VG at the electric power source voltage VDD, the voltage of the PD section is reset (initialization). Further, during a time interval from time t7 to time t8, by again setting the reading signal φV at the electric power source voltage VDD, the reset voltage Vp of the PD section is outputted onto the vertical signal line VSL through the Transistors Q3, Q4, as a reset noise signal Vn.

Both the reset noise signal Vn and the photoelectric conversion signal Vs outputted onto the vertical signal line VSL are differentiated from each other by the sample and hold circuit 162d shown in FIG. 22, so as to generate a pixel signal Vpx (namely, Vpx=Vs−Vn). Then, a plurality of pixel signals Vpx equivalent to one horizontal line are outputted to the A/D converter 163 through the output circuit 162e and the output amplifier 162g as one horizontal line image data 162k. Further, the A/D converter 163 converts the one horizontal line image data 162k to digital captured-image data 163a.

Even in the second embodiment of the image sensor 162, the region (T-Log region), which exhibits a transient characteristic being a mixture of the linear characteristic and the logarithmic characteristic as shown in FIG. 26, and which is the subject to be solved by the present invention, exists in the vicinity of the inflection point, as well as in the first embodiment of the image sensor 162 shown in FIG. 26.

Next, the method for solving the above-mentioned subject of the present invention will be detailed in the following. Initially, referring to FIG. 1, an exemplary configuration of the image capturing apparatus embodied in the present invention will be detailed in the following. FIG. 1 shows a block diagram of the internal configuration of the image capturing apparatus.

An image capturing apparatus 1 is constituted by a lens 131, a lens driving section 133, an aperture 121, an aperture driving section 123, the control section 151, the image sensor 162, the A/D converter 163, an image processing section 165, a storage medium 181, an operating section 111, a display section 113, etc. The image sensor 162 is already indicated in FIG. 22 and FIG. 23.

The light coming from the subject is converged by the lens 131 and adjusted at an appropriate intensity by the aperture 121, so that an image of the subject is appropriately focused onto the image sensor 162. The image sensor 162 photoelectrically converts the image of the subject projected onto its image-sensing surface to the plural sets of horizontal line image data 162k, so as to output them to A/D converter 163. Then, the A/D converter 163 converts the plural sets of horizontal line image data 162k to the digital captured-image data 163a.

Further, the digital captured-image data 163a are inputted into the image processing section 165, in order to apply the gradation conversion processing, detailed later, to the digital captured-image data 163a to generate processed image data 165a, which is outputted to the control section 151. The control section 151 stores the processed image data 165a into the storage medium 181, and makes the display section 113 display the reproduced image represented by the processed image data 165a as needed. On the other hand, the control section 151 conducts both the focus controlling operation (Automatic Focusing operation, so-called AF) of the lens 131 through the lens driving section 133, and the aperture controlling operation (Automatic Exposure operation, so-called AE) through the aperture driving section 123.

In response to operating signals 111a inputted into the control section 151 from the operating section 111 operated by the photographer, the control section 151 controls each of the operations mentioned in the above.

Figure 2:
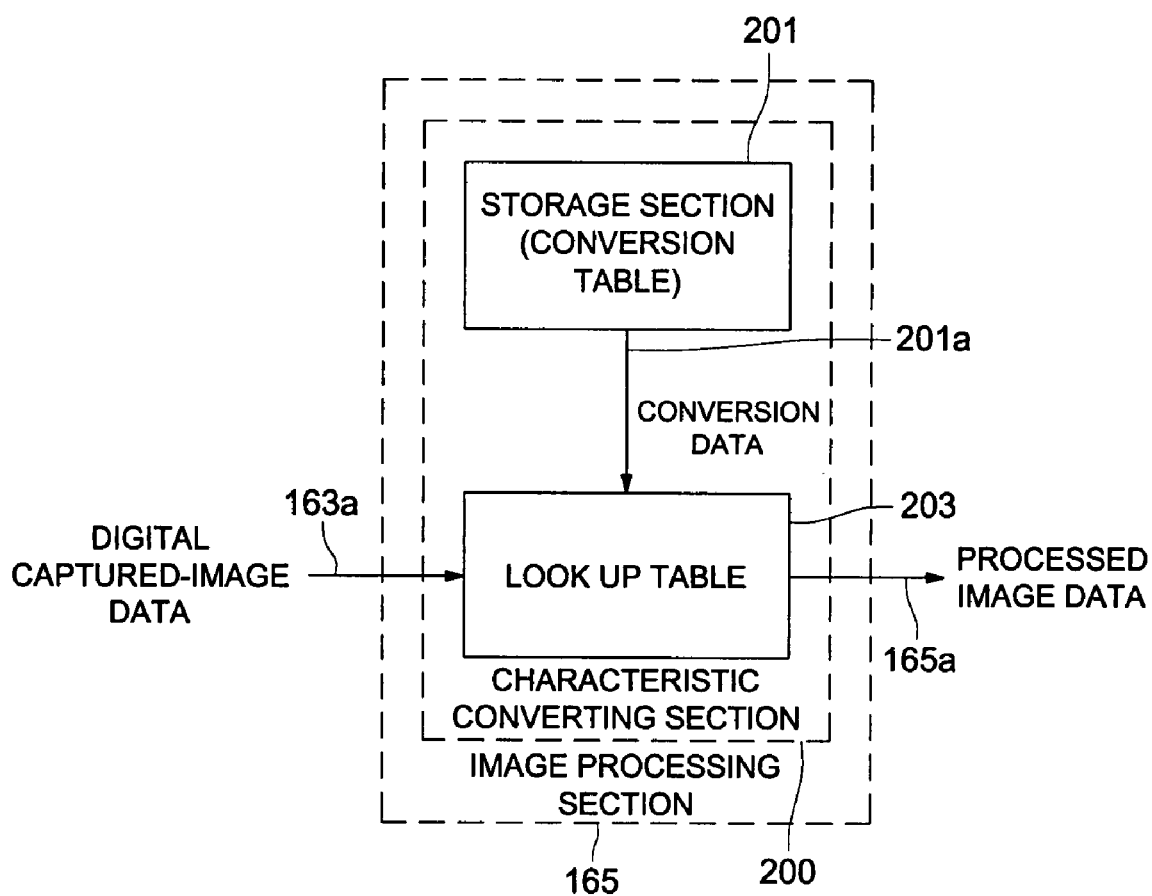
FIG. 2 shows a block diagram of a configuration of a characteristic converting section for applying a gradation conversion processing to digital captured-image data.

Next, referring to FIG. 2, FIG. 3, FIG. 4, FIG. 5, FIG. 6(a) and FIG. 6(b), the first embodiment of the present invention will be detailed in the following. FIG. 2 shows a block diagram of a configuration of a characteristic converting section 200 for applying the gradation conversion processing to the digital captured-image data 163a. The characteristic converting section 200 is included in the image processing section 165.

As shown in FIG. 2, the characteristic converting section 200 is constituted by a storage section 201 and a look up table 203 (hereinafter, referred to as a LUT 203) including memory sections. Plural conversion tables corresponding to various conditions (such as, an exposure time, a level of inflection point, etc.) for driving the image sensor 162 are stored in the storage section 201, so that a value in a conversion table corresponding to the driving condition of the image sensor 162 is outputted to the LUT 203 as conversion data 201a. The conversion data 201a, namely, a conversion table, are a combination of previous data before conversion and converted data after conversion. The converted data after conversion is stored into one of the memory sections included in the LUT 203 having an address indicated by a value of the previous data before conversion. Incidentally, the control section 151 controls the operation for outputting the conversion data 201a from the storage section 201 to the LUT 203.

The digital captured-image data 163a inputted into the image processing section 165 is further inputted into the LUT 203. In the LUT 203, the conversion data 201a, stored in the memory section having the address equivalent to the value of the digital captured-image data 163a, are outputted as the processed image data 165a, so as to achieve the gradation conversion processing.

Figure 3:
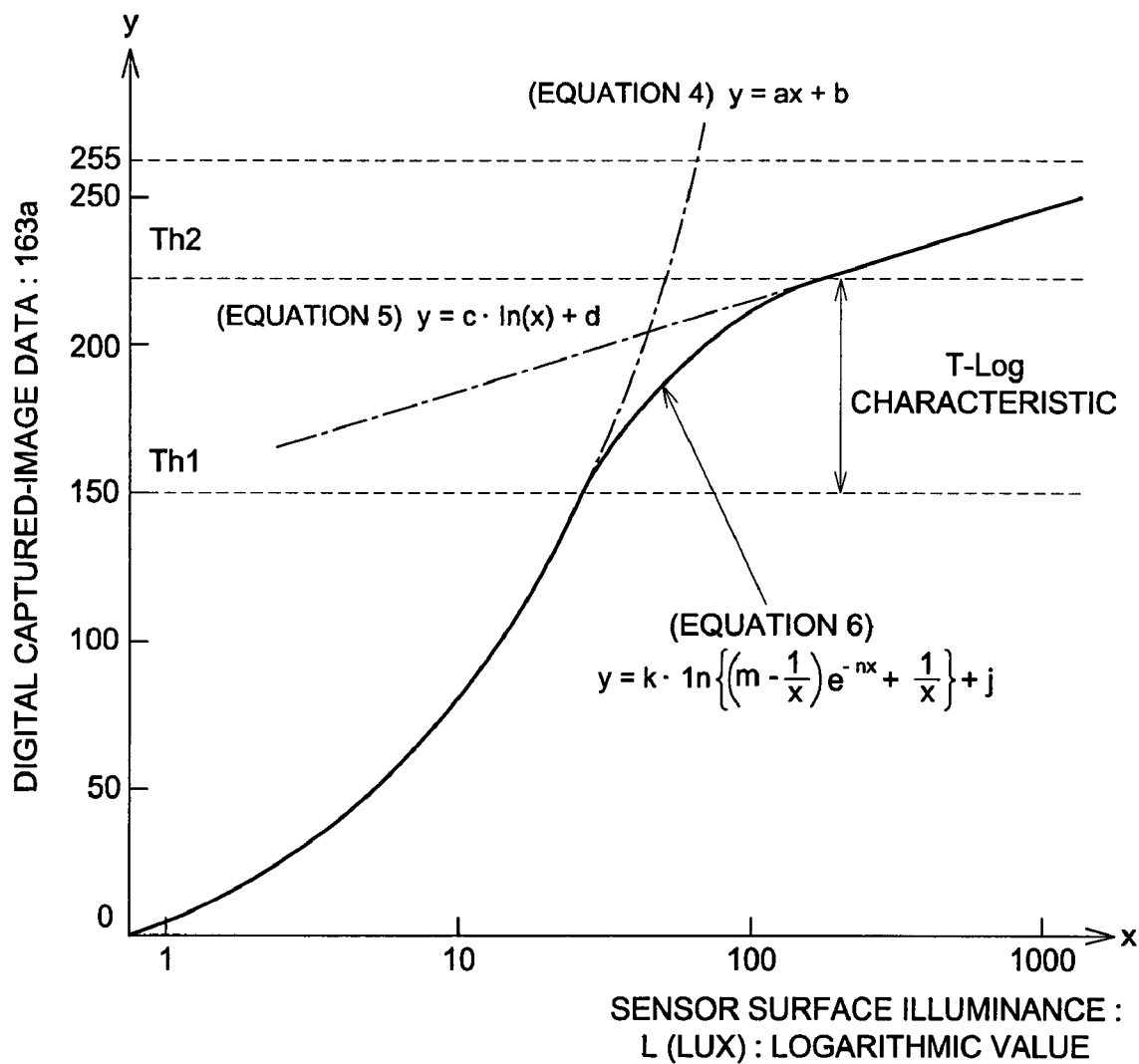
FIG. 3 shows an explanatory graph of a photoelectric conversion characteristic for explaining a method for creating a conversion table to be stored in a storage section shown in FIG. 2.

FIG. 3 shows an explanatory graph of the photoelectric conversion characteristic for explaining a method for creating the conversion table to be stored in the storage section 201 shown in FIG. 2, wherein the x-axis represents logarithmic values of the sensor surface illuminance L of the image sensor 162, while the y-axis represents linear values of the digital captured-image data 163a. Although the scope of the x-axis is limited to a range of 1-1000 lux, while the scale of the y-axis is limited to a range of 0 (zero bit)-255 (8 bits) in FIG. 3, the scope of the sensor surface illuminance L and the scope of the digital captured-image data 163a (number of bits) are not limited to the abovementioned ranges.

The default conversion tables are created and stored into the storage section 201 at the time of, for instance, the shipping adjustment (or the final adjustment before shipment) of the image capturing apparatus 1. The adjustment procedures will be detailed in the following.

(1) PROCESS FOR MEASURING THE PHOTOELECTRIC CONVERSION CHARACTERISTIC: the sensor output, namely, the photoelectric conversion characteristic, is measured by changing the sensor surface illuminance L for every condition (such as, the exposure time, the level of inflection point, etc.) for driving the image sensor 162, so as to acquire the digital captured-image data 163a.

An example of the concrete measuring methods includes the steps of: setting a condition (such as the exposure time, the level of inflection point, etc.) for driving the image sensor 162; directing the image capturing apparatus 1 toward the luminance surface of the measuring apparatus called the luminance box, which has the uniform luminance surface, so as to make the uniform light incident onto the image sensor 162; conducting image capturing operations for every illuminance by changing the sensor surface illuminance L in accordance with the changing operation of the luminance value of the luminance box; storing the processed image data 165a into the storage medium 181 without applying the image processing to the digital captured-image data 163a inputted into the image processing section 165; calculating an average value (an average value of all over the image, or a partial average value of a center portion of the image, etc.) of the digital captured-image data 163a in respect to each sensor surface illuminance L from the processed image data 165a stored, by employing a personal computer (not shown in the drawings); and calculating the photoelectric conversion characteristic model, to be detailed in the following, from the calculated average value.

At first, referring to FIG. 3, a model equation for the linear characteristic is derived from data of low illuminance side included in the digital captured-image data 163a acquired. Concretely speaking, coefficients "a" and "b" included in the following equation for the linear characteristic, which is derived from the Equation 1 by replacing the constant values with the symbols, will be found.

$$y = ax + b \quad \text{(Equation 4)}$$

where y=Vp and x=Ip.

In the same way as the above, coefficients "c" and "d" included in the following model equation for the logarithmic characteristic, which is derived from the Equation 2 by replacing the constant values with the symbols, will be found.

$$y = c \cdot \ln(x) + d \quad \text{(Equation 5)}$$

By comparing values calculated by employing the model Equations 4 and 5 with the value of the digital captured-image data 163a, acquired by the measurement, the range of the digital captured-image data 163a, in which the measured value deviates from the calculated values of the model Equations 4 and 5 by more than a predetermined value, is defined as the T-Log region. When determining the T-Log region on the basis of the deviation from the model Equations, it is preferable that the T-Log region is determined by judging a deviation at the transition point from the T-Log region to the logarithmic characteristic region (Th2 shown in FIG. 3) with a severer standard, compared to that at the transition point from the linear characteristic region to the T-Log region (Th1 shown in FIG. 3). Concretely speaking, it is preferable that the threshold level employed for judging the T-Log region for Th1 is set at a value smaller that that for Th2. This is because, since the luminance amplitude of the subject versus signal amplitude in the logarithmic characteristic region is smaller than that in the linear characteristic region, the signal processing in the logarithmic characteristic region should be conducted more accurately. Accordingly, for instance, when determining Th2 and Th1 on the same standard for simplicity, it is preferable that the standard is determined by finding the accuracy required for determining Th2 prior to that for determining Th1, and the determined standard is also employed for Th1. In other words, Th1 is also determined in such a manner that the standard for Th2 overrides that for Th1. Further, it is applicable that any one of a method for observing the vertical axis shown in FIG. 3, a method for observing horizontal axis shown in FIG. 3 and other applicable methods is employed for finding an actual amount of the deviation. Then, the concrete standard is determined on the basis of the image quality required for the finally acquired image. Coefficients "m" "n" and "j" included in the following model equation for the T-Log region characteristic, which is derived from the Equation 3 by replacing the constant values with the symbols, will be found from the digital captured-image data 163a in the T-Log region acquired.

$$y = k \cdot \ln\left\{\left(m - \frac{1}{x}\right)e^{-nx} + \frac{1}{x}\right\} + j \quad \text{(Equation 6)}$$

(2) PROCESS FOR CREATING THE CONVERSION TABLE: based on the Equations 4, 5 and 6, which are the three photoelectric-conversion characteristic model equations derived in the above process, the conversion table will be created in this process.

At first, values Th1 and Th2 of the digital captured-image data 163a on the changeover points, at which the three photoelectric conversion characteristics are replaced by each other, will be found. The value Th1 represents the changeover point at which the linear characteristic is replaced by the T-Log characteristic, and is found as a value of the digital captured-image data 163a, residing on either a duplicated point or an intersection of the Equations 4 and 6, while the value Th2 represents the changeover point at which the T-Log characteristic is replaced by the logarithmic characteristic, and is found as a value of the digital captured-image data 163a, residing on either a duplicated point or an intersection of the Equations 5 and 6.

The conversion table is created by employing the values Th1 and Th2 on the changeover points and the photoelectric-conversion characteristic model Equation 4, 5 and 6, found in the above process. Hereinafter, two kinds of processing, including: (A) a processing for unifying the photoelectric conversion characteristic after conversion into the logarithmic characteristic of the image sensor 162 so as to output the processed image data having the logarithmic characteristic; and (B) a processing for unifying the photoelectric conversion characteristic after conversion into the linear characteristic of the image sensor 162 so as to output the processed image data having the linear characteristic, and two kinds of conversion table respectively corresponding to the two kinds of the abovementioned processing will be created.

Figure 4:
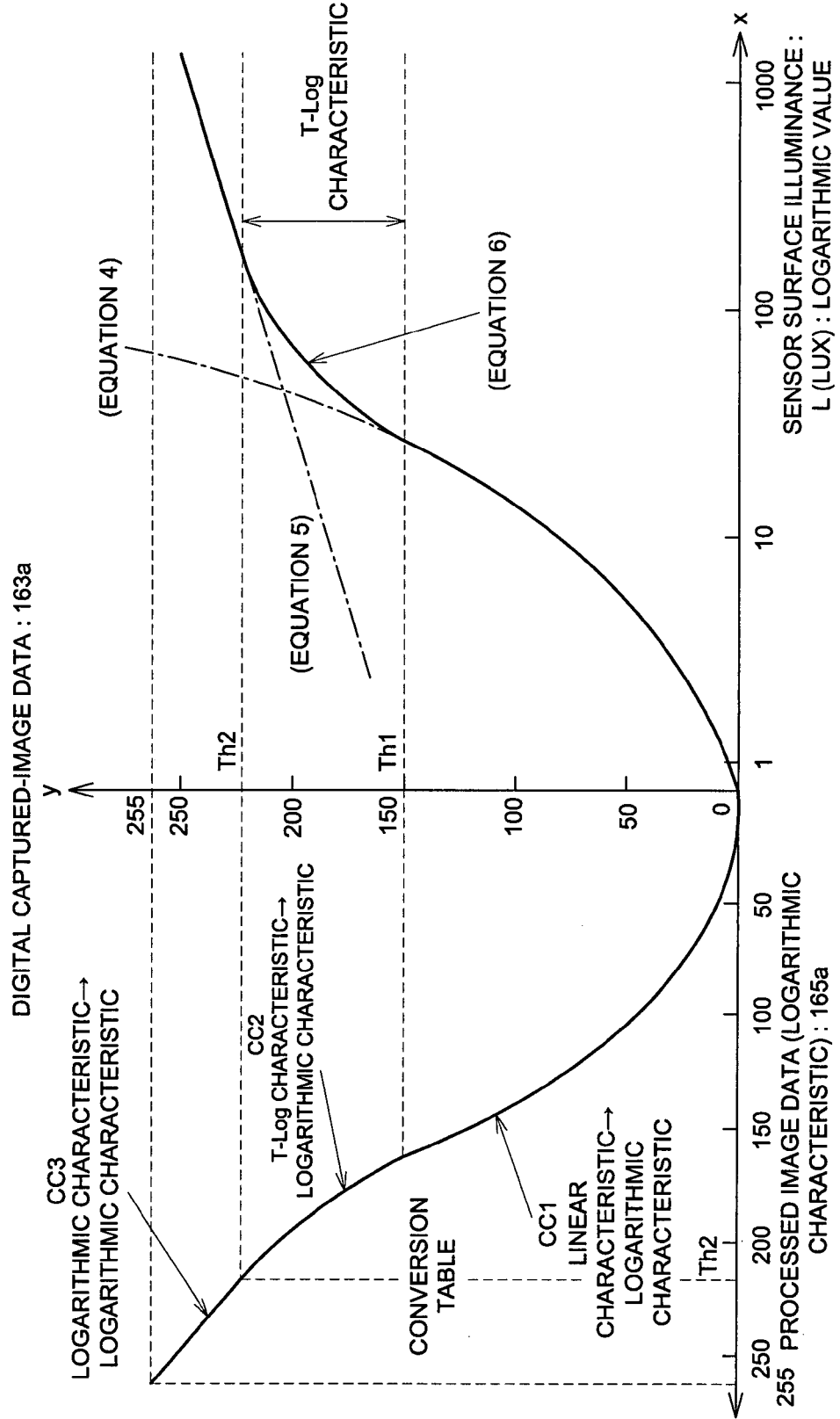
FIG. 4 shows a graph in which a conversion table, for converting digital captured-image data to processed image data having a logarithmic characteristic, is added to the graph shown in FIG. 3.

Initially, referring to FIG. 4, (A) a processing for unifying the photoelectric conversion characteristic after conversion into the logarithmic characteristic of the image sensor 162 so as to output the processed image data having the logarithmic characteristic, will be detailed in the following. FIG. 4 shows a graph in which the conversion table, for converting the digital captured-image data 163a to the processed image data 165a having the logarithmic characteristic, is added to the graph shown in FIG. 3.

As shown in FIG. 4, this conversion table includes three different conversion characteristics. A first conversion characteristic CC1 is employed for converting the linear characteristic to the logarithmic characteristic of the image sensor 162, namely, it is the conversion table in which the Equations 4 and 5 are employed for input and output characteristics, respectively, and its conversion range is from zero to Th1 as the input level. A second conversion characteristic CC2 is employed for converting the T-Log characteristic to the logarithmic characteristic of the image sensor 162, namely, it is the conversion table in which the Equations 6 and 5 are employed for input and output characteristics, respectively, and its conversion range is from Th1 to Th2 as the input level. A third conversion characteristic CC3 is employed for converting the logarithmic characteristic to the logarithmic characteristic of the image sensor 162, namely, it is the conversion table in which the Equation 5 is employed for both input and output characteristics (incidentally, in this case, since the same Equation 5 is employed, the input data are passed through to the output without any processing), and its conversion range is from Th2 to the maximum value of the digital captured-image data 163a as the input level.

Incidentally, although the output characteristic is established as the logarithmic characteristic of the image sensor 162 in the example mentioned in the above, the scope of the present invention is not limited to the above, and an arbitral logarithmic characteristic can be employed as the output characteristic. In this case, it is necessary to convert the logarithmic characteristic represented by the Equation 5 to the arbitral logarithmic characteristic in the third conversion characteristic CC3.

Next, referring to FIG. 5, (B) a processing for unifying the photoelectric conversion characteristic after conversion into the linear characteristic of the image sensor 162 so as to output the processed image data having the linear characteristic, will be detailed in the following. FIG. 4 shows a graph in which the conversion table, for converting the digital captured-image data 163a to the processed image data 165a having the linear characteristic, is added to the graph shown in FIG. 3.

Figure 5:
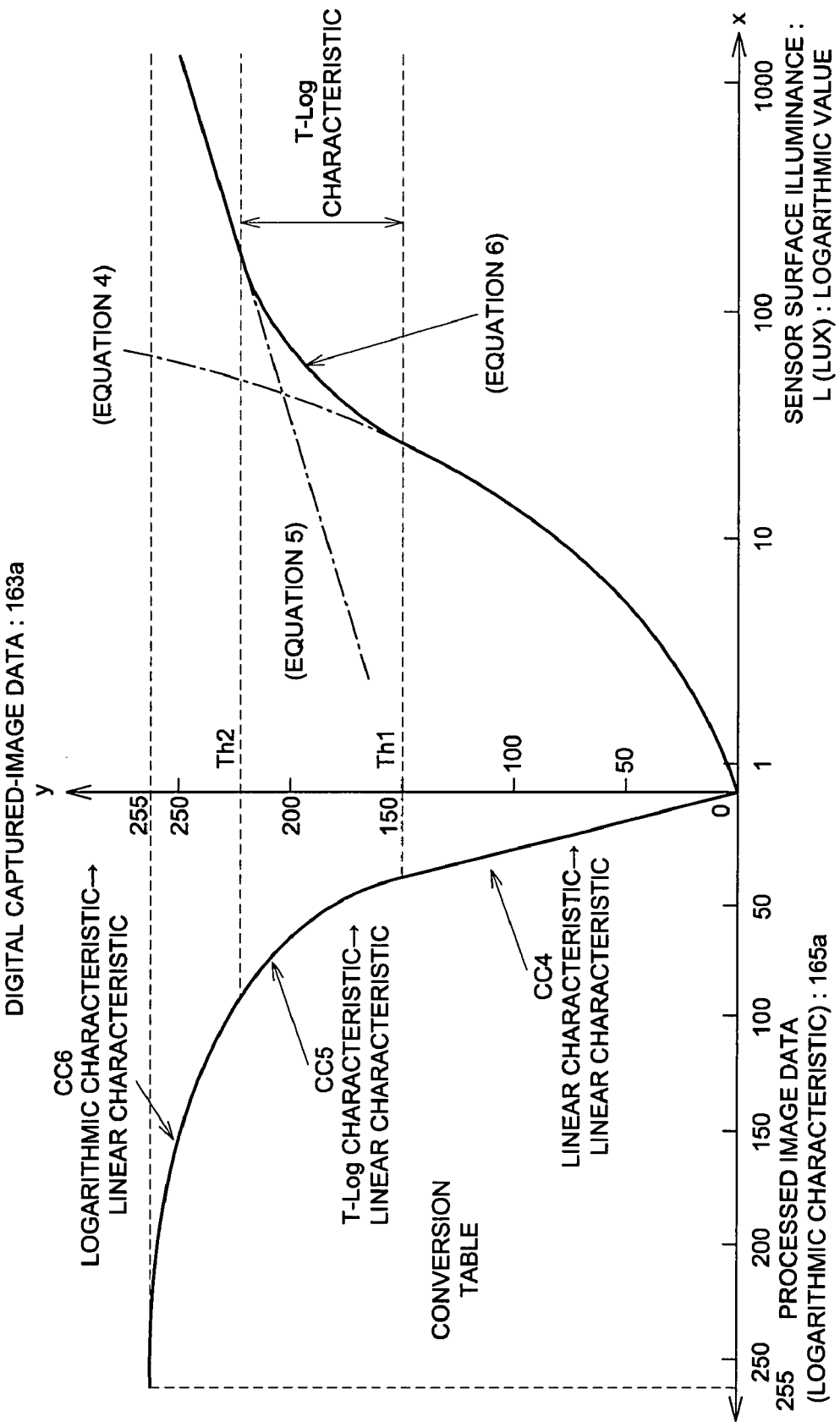
FIG. 5 shows a graph in which a conversion table, for converting digital captured-image data to processed image data having a linear characteristic, is added to the graph shown in FIG. 3.
Figure 6:
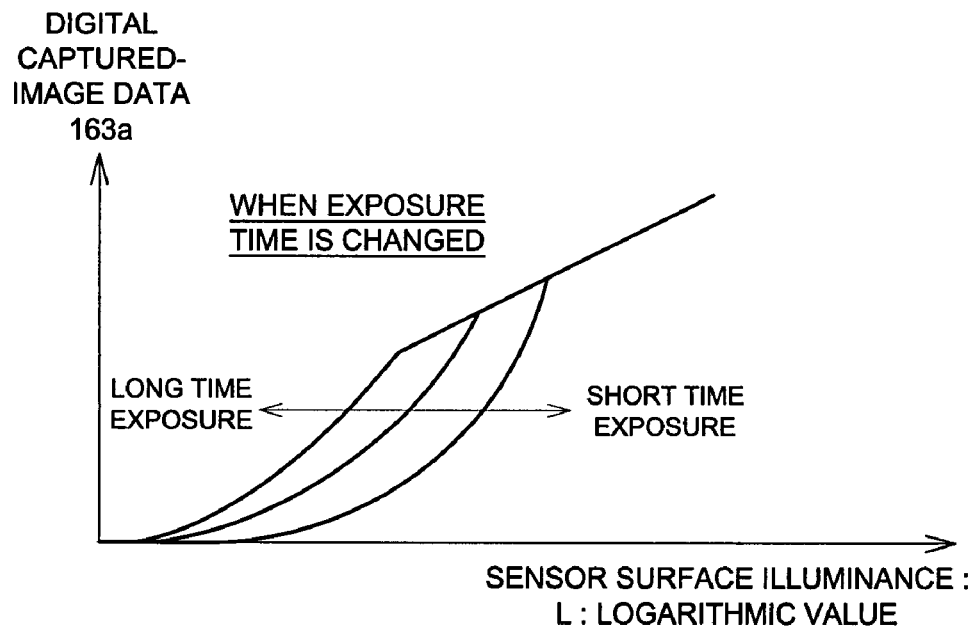
FIG. 6(a) and FIG. 6(b) show graphs indicating variations of photoelectric conversion characteristics when driving conditions are changed.
Figure 6:
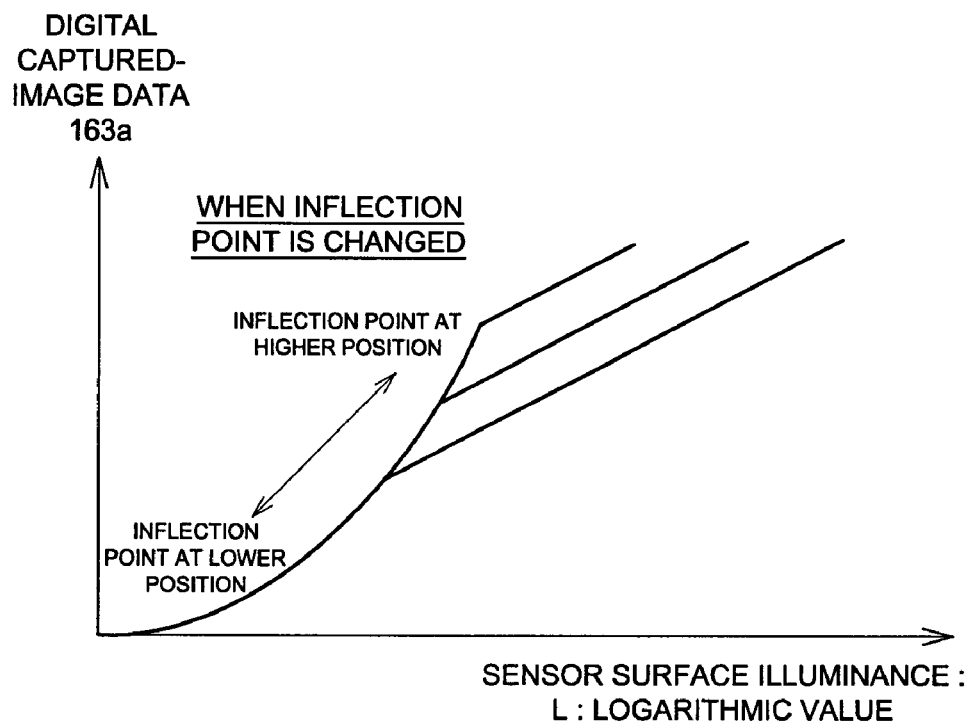

As shown in FIG. 5, this conversion table includes three different conversion characteristics, as well as the example shown in FIG. 4. A fourth conversion characteristic CC4 is employed for converting the linear characteristic to the linear characteristic of the image sensor 162, namely, it is the conversion table in which the Equation 4 is employed for both input and output characteristics (incidentally, in this case, since the linear characteristic is employed for both input and output characteristics, the input data are merely multiplied by an coefficient to derive the output data), and its conversion range is from zero to Th1 as the input level. A fifth conversion characteristic CC5 is employed for converting the T-Log characteristic to the linear characteristic of the image sensor 162, namely, it is the conversion table in which the Equations 6 and 4 are employed for input and output characteristics, respectively, and its conversion range is from Th1 to Th2 as the input level. A sixth conversion characteristic CC6 is employed for converting the logarithmic characteristic to the linear characteristic of the image sensor 162, namely, it is the conversion table in which the Equations 5 and 4 are employed for input and output characteristics, respectively, and its conversion range is from Th2 to the maximum value of the digital captured-image data 163a as the input level.

Incidentally, although the output characteristic is established as the linear characteristic (represented by the Equation 4) of the image sensor 162 in the example mentioned in the above, the scope of the present invention is not limited to the above, and an arbitral linear characteristic can be employed as the output characteristic.

Each of the abovementioned conversion tables with respect to items (A) and (B) is calculated for every driving condition (such as the exposure time, the level of inflection point, etc.), and stored in the storage section 201 of the characteristic converting section 200. FIG. 6(a) and FIG. 6(b) show graphs indicating variations of the photoelectric conversion characteristics when the driving conditions (the exposure time and the level of inflection point) are changed, wherein the horizontal axis represents logarithmic values of sensor surface illuminance L, while the vertical axis represents a linear axis of the digital captured-image data 163a.

FIG. 6(a) shows a graph indicating variations of the photoelectric conversion characteristics when the exposure time is set at a variable value, while the aperture value of the lens and the level of inflection point are set at respective constant values. As shown in FIG. 6(a), according as the exposure time is shortened, the linear characteristic region of the photoelectric conversion characteristic is getting wider, and the level of inflection point shifts to the high illuminance side. Conversely, the longer the exposure time is, the narrower the linear characteristic region of the photoelectric conversion characteristic is, and the level of inflection point shifts to the low illuminance side. Even if the position of the inflection point varies, the inclination angle of the logarithmic characteristic is kept constant, and accordingly, it can be represented by one straight-line characteristic. Although it is not shown in the drawings, the T-Log region exists in the vicinity of the inflection point.

FIG. 6(b) shows a graph indicating variations of the photoelectric conversion characteristics when the level of inflection point is set at a variable value, while the aperture value of the lens and the exposure time are set at respective constant values. As shown in FIG. 6(b), when the level of inflection point is set at a high level by setting the intermediate voltage VM of the transfer signal φTX of the Transistor Q1 shown in FIG. 24, the region of the linear characteristic is widened. Conversely, when the level of inflection point is set at a low level, the region of the linear characteristic is narrowed. Even if the position of the inflection point varies, the inclination angle of the logarithmic characteristic is kept constant, and accordingly, it can be represented by one straight-line characteristic. Although it is not shown in the drawings, the T-Log region exists in the vicinity of the inflection point.

As described in the foregoing, according to the first embodiment of the present invention, since the measured values of the digital captured-image data are adapted to the theoretical equations to calculate the coefficient values, so that the gradation conversion processing is conducted by employing the theoretical equations, not only in the linear and logarithmic characteristic regions, but also in the T-Log characteristic region, which is a transient characteristic between the linear and logarithmic characteristics, it becomes possible not only to accurately conduct the gradation conversion processing, but also to improve the gradation reproducibility. As a result, it becomes possible to contribute the progress of the high quality imaging trend.

Next, referring to FIG. 7, FIG. 8, FIG. 9, the second embodiment of the present invention will be detailed in the following. In the second embodiment, the method for creating the conversion table to be stored in the storage section 201 shown in FIG. 2 of the first embodiment mentioned in the foregoing is changed to another second method. Other aspects of the second embodiment are the same as those of the first embodiment.

Figure 7:
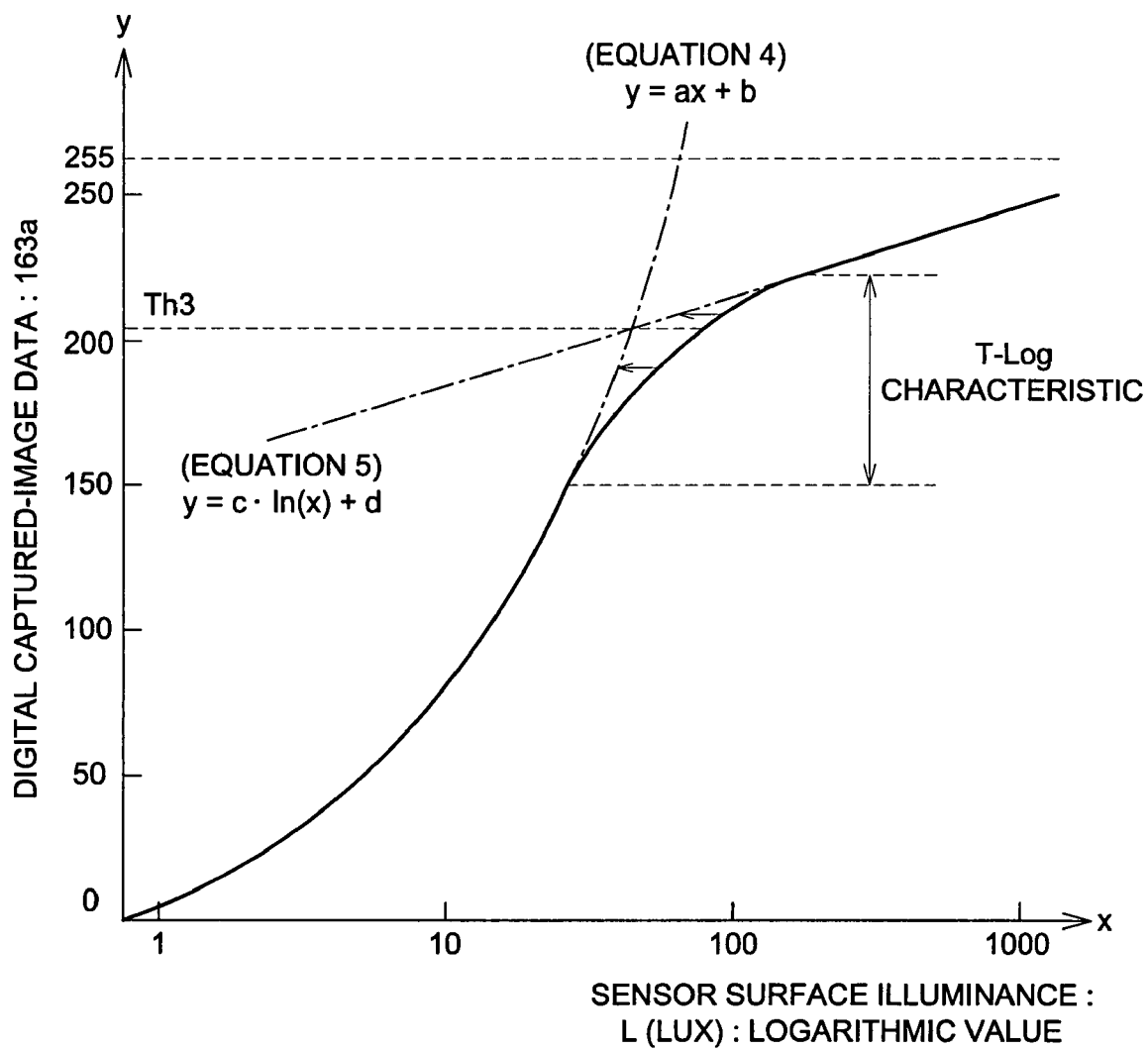
FIG. 7 shows an explanatory graph of a photoelectric conversion characteristic, for explaining a second method for creating a conversion table to be stored in the storage section shown in FIG. 2.

FIG. 7 shows an explanatory graph of the photoelectric conversion characteristic, for explaining the second method for creating a conversion table to be stored in the storage section 201 shown in FIG. 2. As well as in the first embodiment, the default conversion tables are created and stored into the storage section 201 at the time of, for instance, the shipping adjustment (or the final adjustment before shipment) of the image capturing apparatus 1.

Referring to FIG. 7, by employing the Equations 4 and 6, a value Th3 of the digital captured-image data 163a on the changeover point at which the two photoelectric conversion characteristics represented by the both equations are replaced by each other, will be found. The value Th3, residing on the changeover point at which the two photoelectric conversion characteristics represented by the Equations 4 and 6 intersects each other, is set within a range of the T-Log characteristic region. Then, the values of the digital captured-image data 163a, which are near to the linear characteristic, namely, smaller than the value Th3, are processed as linear characteristic values, while the values of the digital captured-image data 163a, which are near to the logarithmic characteristic, namely, equal to or greater than the value Th3, are processed as logarithmic characteristic values. The conversion table is created by employing the value Th3 at the changeover point mentioned in the above, the Equation 4 and the Equation 5. Even in the second embodiment, two kinds of processing, including: (A) a processing for unifying the photoelectric conversion characteristic after conversion into the logarithmic characteristic of the image sensor 162 so as to output the processed image data having the logarithmic characteristic; and (B) a processing for unifying the photoelectric conversion characteristic after conversion into the linear characteristic of the image sensor 162 so as to output the processed image data having the linear characteristic, are considered as the gradation conversion processing, and two kinds of conversion table respectively corresponding to the two kinds of the abovementioned processing will be created.

Initially, referring to FIG. 8, (A) a processing for unifying the photoelectric conversion characteristic after conversion into the logarithmic characteristic of the image sensor 162 so as to output the processed image data having the logarithmic characteristic, will be detailed in the following. FIG. 8 shows a graph in which the conversion table, for converting the digital captured-image data 163a to the processed image data 165a having the logarithmic characteristic, is added to the graph shown in FIG. 7.

As shown in FIG. 4, this conversion table includes two different conversion characteristics. A first conversion characteristic CC11 is employed for converting the linear characteristic to the logarithmic characteristic of the image sensor 162, namely, it is the conversion table in which the Equations 4 and 5 are employed for input and output characteristics, respectively, and its conversion range is from zero to Th3 as the input level. A second conversion characteristic CC12 is employed for converting the T-Log characteristic to the logarithmic characteristic of the image sensor 162, namely, it is the conversion table in which the Equation 5 is employed for both input and output characteristics (incidentally, in this case, since the same Equation 5 is employed, the input data are passed through to the output without any processing), and its conversion range is from Th3 to the maximum value of the digital captured-image data 163a as the input level.

Incidentally, although the output characteristic is established as the logarithmic characteristic of the image sensor 162 in the example mentioned in the above, the scope of the present invention is not limited to the above, and an arbitral logarithmic characteristic can be employed as the output characteristic. In this case, it is necessary to convert the logarithmic characteristic represented by the Equation 5 to the arbitral logarithmic characteristic in the second conversion characteristic CC12.

Next, referring to FIG. 9, (B) a processing for unifying the photoelectric conversion characteristic after conversion into the linear characteristic of the image sensor 162 so as to output the processed image data having the linear characteristic, will be detailed in the following. FIG. 9 shows a graph in which the conversion table, for converting the digital captured-image data 163a to the processed image data 165a having the linear characteristic, is added to the graph shown in FIG. 7.

Figure 8:
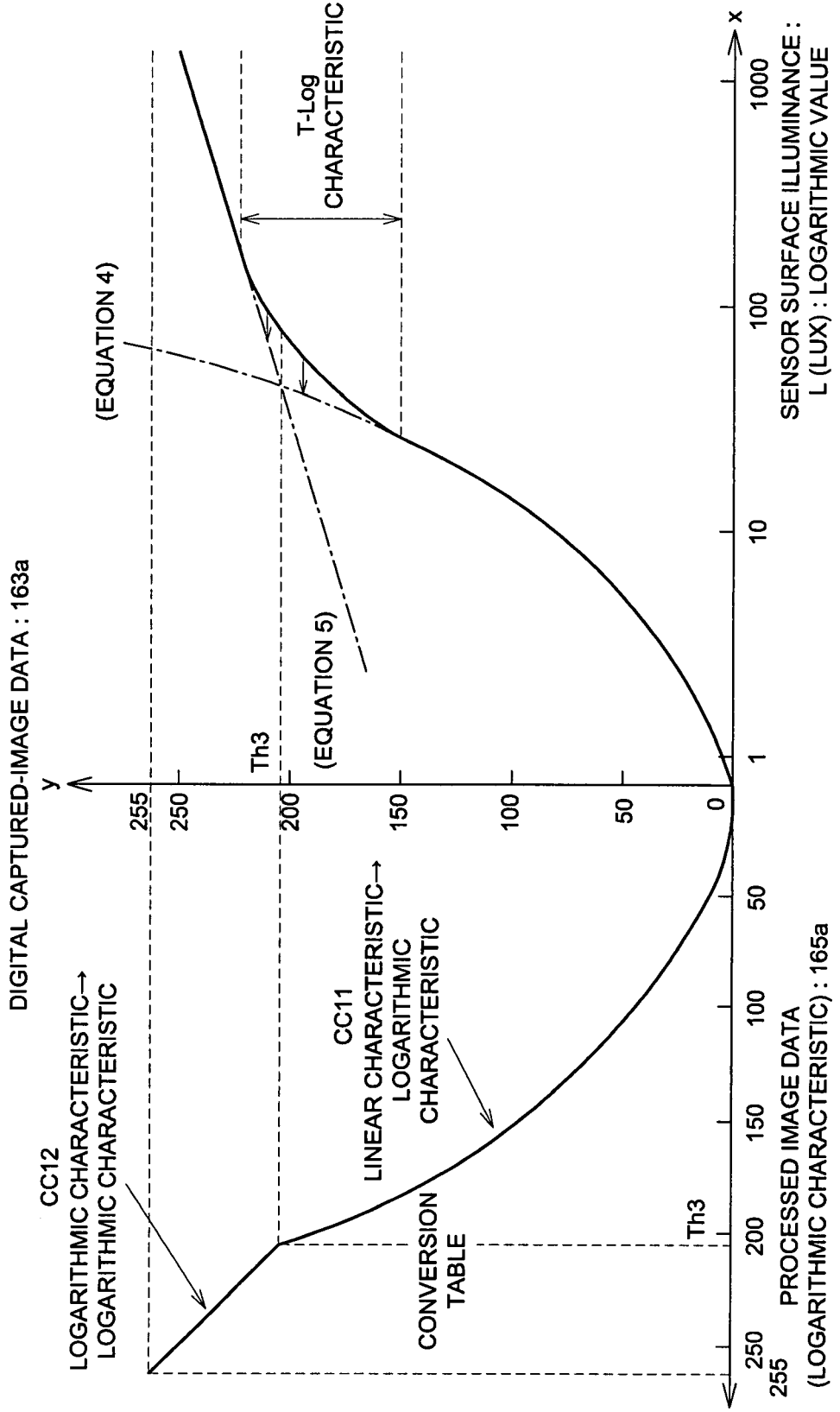
FIG. 8 shows a graph in which a conversion table, for converting digital captured-image data to the processed image data having the logarithmic characteristic, is added to the graph shown in FIG. 7.
Figure 9:
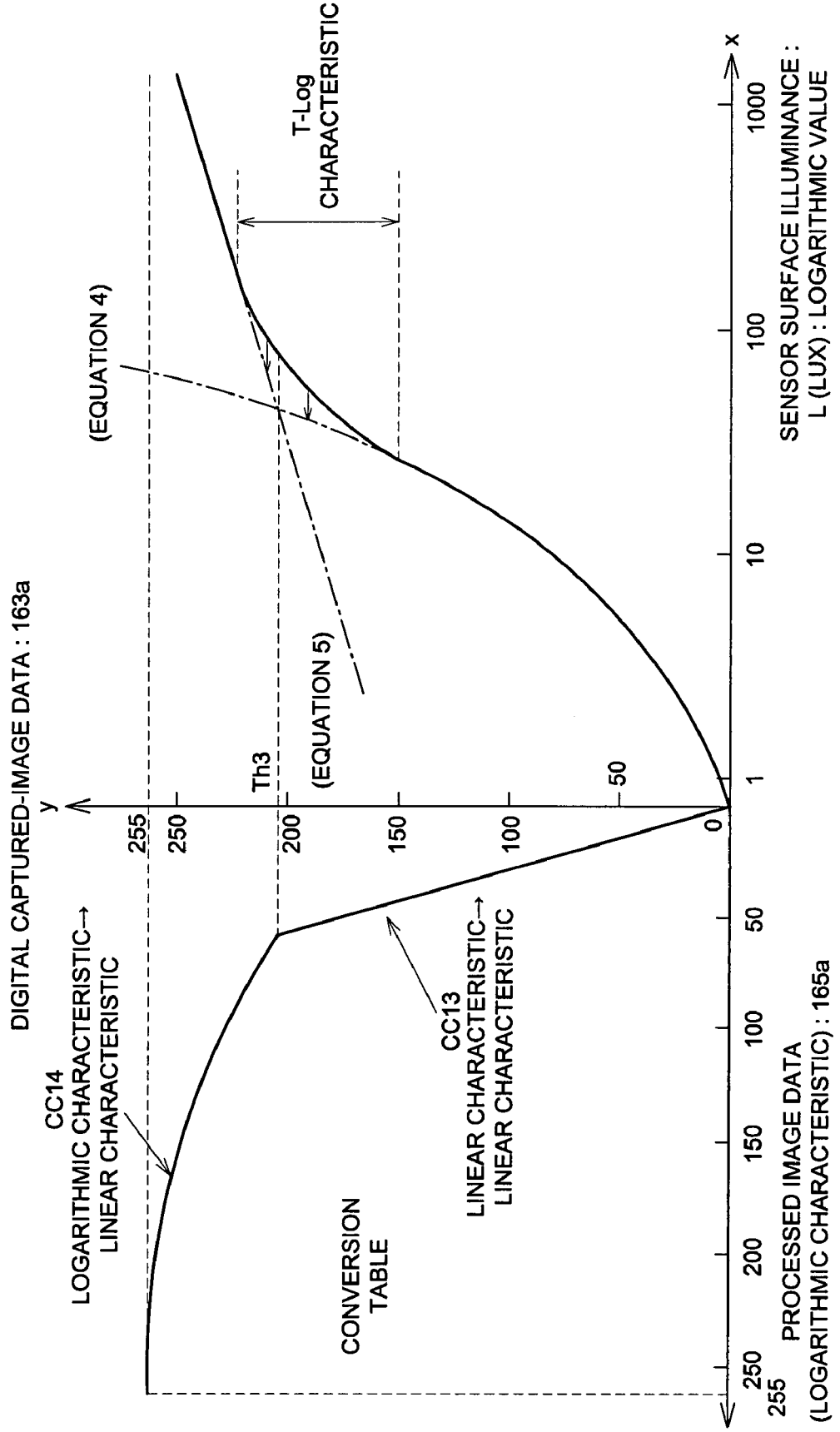
FIG. 9 shows a graph in which a conversion table, for converting digital captured-image data to processed image data having the linear characteristic, is added to the graph shown in FIG. 7.

As shown in FIG. 9, this conversion table includes two different conversion characteristics, as well as the example shown in FIG. 8. A third conversion characteristic CC13 is employed for converting the linear characteristic to the linear characteristic of the image sensor 162, namely, it is the conversion table in which the Equation 4 is employed for both input and output characteristics (incidentally, in this case, since the linear characteristic is employed for both input and output characteristics, the input data are merely multiplied by an coefficient to derive the output data), and its conversion range is from zero to Th3 as the input level. A fourth conversion characteristic CC14 is employed for converting the logarithmic characteristic to the linear characteristic of the image sensor 162, namely, it is the conversion table in which the Equations 5 and 4 are employed for input and output characteristics, respectively, and its conversion range is from Th3 to the maximum value of the digital captured-image data 163a as the input level.

Incidentally, although the output characteristic is established as the linear characteristic (represented by the Equation 4) of the image sensor 162 in the example mentioned in the above, the scope of the present invention is not limited to the above, and an arbitral linear characteristic can be employed as the output characteristic.

Each of the abovementioned conversion tables with respect to items (A) and (B) is calculated for every driving condition (such as the exposure time, the level of inflection point, etc.), and stored in the storage section 201 of the characteristic converting section 200.

As described in the foregoing, according to the second embodiment of the present invention, since the T-Log characteristic region is approximated to either the linear characteristic or the logarithmic characteristic, it becomes possible to eliminate the introduction of such the complicated equation as the Equation 6 indicated in the first embodiment, so as to make it possible to alleviate a burden for the arithmetic computations to a relatively small amount. Accordingly, for instance, instead of employing a personal computer, the arithmetic computations can be executed by a processing device having a low processing capability, such as a microcomputer normally equipped in the image capturing apparatus, and therefore, it becomes possible to easily cope with the adjustment operations to be conducted at the time of repair.

Next, referring to FIGS. 10-17(c), the third embodiment of the present invention will be detailed in the following. Even in the third embodiment, two kinds of processing, including: (A) a processing for unifying the photoelectric conversion characteristic after conversion into the logarithmic characteristic of the image sensor 162 so as to output the processed image data having the logarithmic characteristic; and (B) a processing for unifying the photoelectric conversion characteristic after conversion into the linear characteristic of the image sensor 162 so as to output the processed image data having the linear characteristic, are considered as the gradation conversion processing.

Initially, referring to FIGS. 10-13(c), (A) a processing for unifying the photoelectric conversion characteristic after conversion into the logarithmic characteristic of the image sensor 162 so as to output the processed image data having the logarithmic characteristic, will be detailed in the following.

Figure 10:
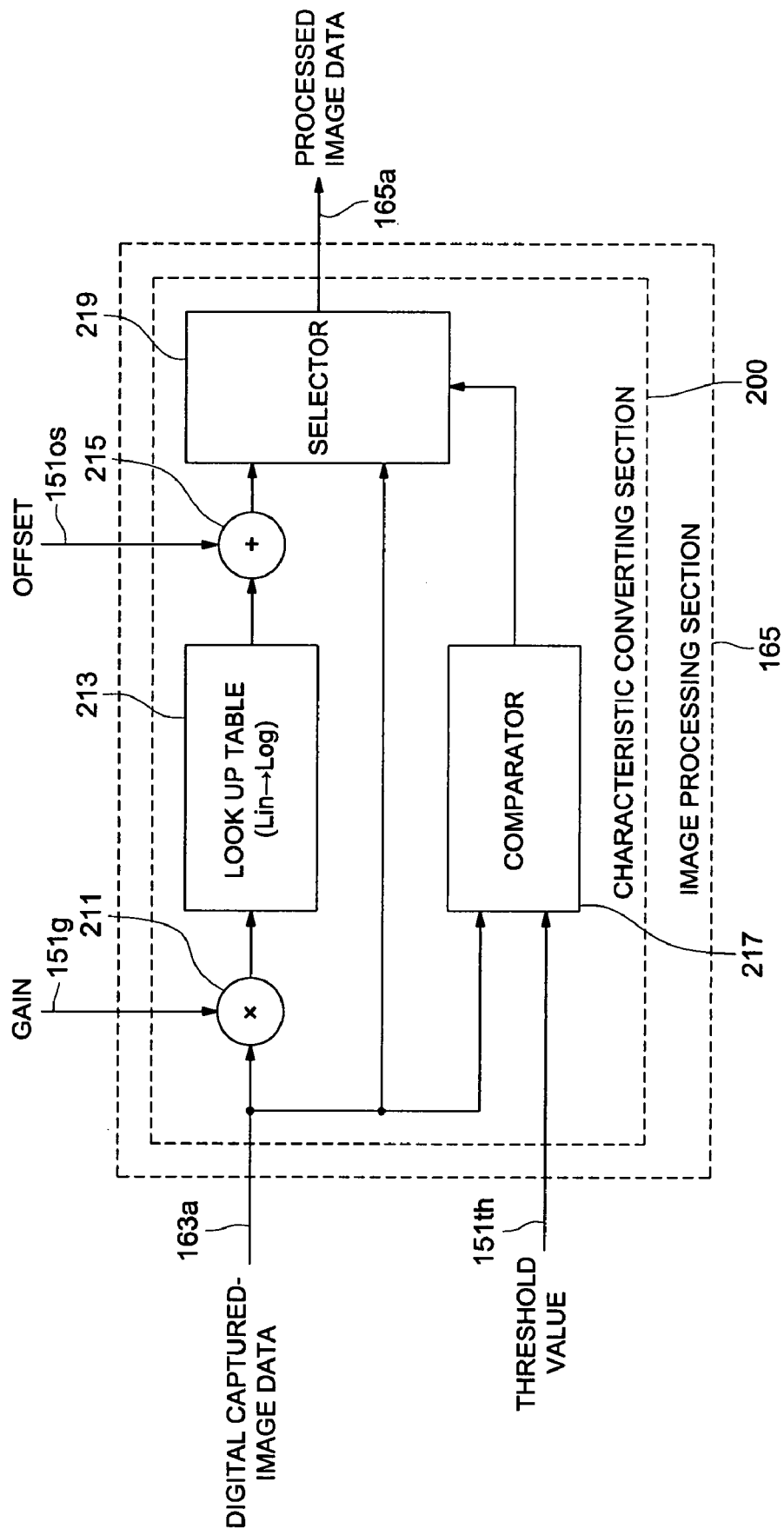
FIG. 10 shows a circuit block diagram of a configuration of a characteristic converting section for conducting a processing for unifying the photoelectric conversion characteristic after gradation conversion processing into a logarithmic characteristic of an image sensor so as to output processed image data having a logarithmic characteristic.

FIG. 10 shows a circuit block diagram of a configuration of the characteristic converting section 200 for conducting (A) a processing for unifying the photoelectric conversion characteristic after conversion into the logarithmic characteristic of the image sensor 162 so as to output the processed image data having the logarithmic characteristic. This configuration indicates an example of the hardware, which conducts the characteristic conversion processing detailed in the foregoing with reference to FIG. 8.

As shown in FIG. 10, the characteristic converting section 200 is constituted by a multiplier 211, a LUT (Look Up Table) 213, an adder 215, a comparator 217 and a selector 219, and receives the digital captured-image data 163a sent from the A/D converter 163, a threshold value 151th, a gain 151g and an offset 151os sent from the control section 151, and outputs the processed image data 165a. Hereinafter, the threshold value 151th is such a value to be used for determining which one of the digital captured-image data 163a and the output of the LUT 213 should be outputted as the processed image data 165a, while the gain 151g and the offset 151os are parameters for matching the digital captured-image data 163a to the conversion table stored in the LUT 213. The explanations for the above will be detailed later, referring to FIG. 12, FIG. 13, FIG. 15 and FIG. 16.

The digital captured-image data 163a inputted into the characteristic converting section 200 are further inputted into the multiplier 211, in which the multiple processing is applied to the digital captured-image data 163a by employing the gain 151g established in the control section 151, so as to match the inclination angle of them with that of the reference linear characteristic, and then, the processed digital captured-image data 163a are outputted to the LUT 213, in which the characteristic conversion processing from the reference linear characteristic to the reference logarithmic characteristic is further applied to them. The LUT 213 includes memory sections, in order to output the conversion data stored in one of the memory sections having an address designated by the value of the inputted data. The conversion table, which is converted from the reference linear characteristic to the reference logarithmic characteristic, is inputted into the conversion data.

In the adder 215, the offset 151os established in the control section 151 is added to the data of the reference logarithmic characteristic outputted from the LUT 213. The reference logarithmic characteristic data with the offset, outputted from the adder 215, are inputted into the selector 219. Further, the digital captured-image data 163a are also inputted into the selector 219. On the other hand, both the threshold value 151th established by the control section 151 and the digital captured-image data 163a are inputted into the comparator 217, which outputs the comparison result between them to the selector 219.

Based on the comparison result inputted from the comparator 217, the selector 219 outputs the reference logarithmic characteristic data with the offset as the processed image data 165a when the value of the digital captured-image data 163a is smaller than the threshold value 151th (linear characteristic region), while the selector 219 outputs the digital captured-image data 163a as the processed image data 165a when the value of the digital captured-image data 163a is equal to or greater than the threshold value 151th (logarithmic characteristic region).

Next, referring to FIG. 11, the method for creating the conversion table, stored in the LUT 213 shown in FIG. 10, will be detailed in the following. As well as the first and second embodiments, the default conversion tables are created and stored into the LUT 213 at the time of, for instance, the shipping adjustment (or the final adjustment before shipment) of the image capturing apparatus 1. The adjustment procedures will be detailed in the following.

(1) PROCESS FOR MEASURING THE PHOTOELECTRIC CONVERSION CHARACTERISTIC: the same process as that of the first and second embodiments can be also applied to the third embodiment. Accordingly, the explanations for it are omitted.

Figure 11:
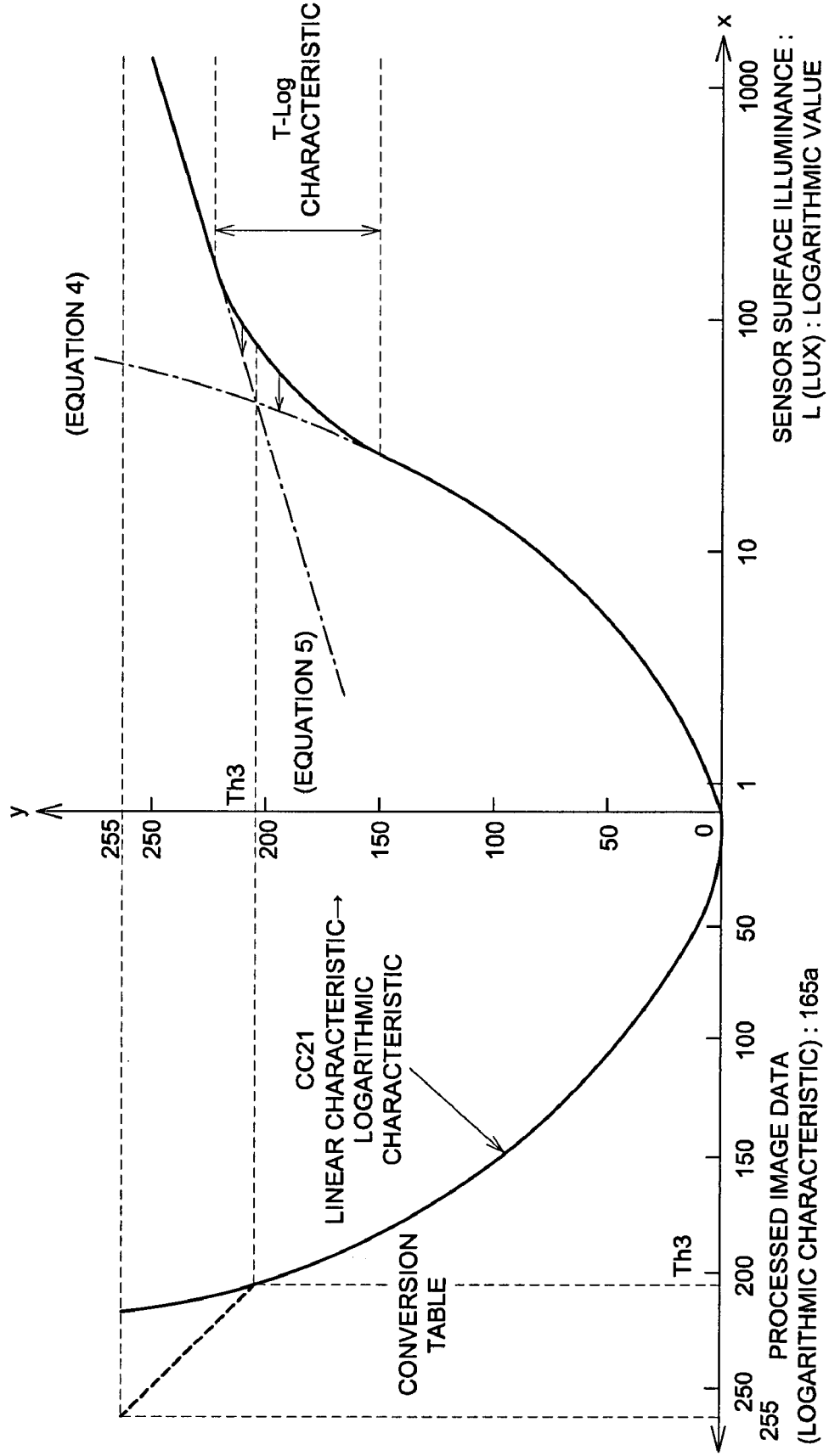
FIG. 11 shows a graph in which a conversion table, for converting digital captured-image data to processed image data having a logarithmic characteristic, is added to the graph shown in FIG. 7.

(2) PROCESS FOR CREATING THE CONVERSION TABLE: the conversion table to be stored into the LUT 213 shown in FIG. 10 is shown in FIG. 11. As well as FIG. 8, FIG. 11 shows a graph in which the conversion table, for converting the digital captured-image data 163a to the processed image data 165a having the logarithmic characteristic, is added to the graph shown in FIG. 7. This conversion table includes only a conversion characteristic CC21 in which the Equations 4 and 5 are employed for input and output characteristics, respectively. Further, in this third embodiment, only the conversion table from the linear characteristic to the logarithmic characteristic under a driving condition to be reference among the driving conditions of the image sensor 162 (the exposure time and the level of the inflection point) is created, and, by employing the characteristic converting section 200 shown in FIG. 10, the linear portion of the digital captured-image data 163a is converted according to the Equation 4, and then, further converted according to the Equation 5 to output the converted data.

Next, referring to FIG. 12(a), FIG. 12(b), FIG. 12(c), FIG. 13(a), FIG. 13(b) and FIG. 13(c), the method for establishing the three parameters, including the threshold value 151th, the gain 151g and the offset 151os, will be detailed in the following. The abovementioned three parameters vary depending on the driving condition of the image sensor 162 (the exposure time and the level of the inflection point).

At first, referring to FIG. 12(a), FIG. 12(b) and FIG. 12(c), the case, shown in FIG. 6(a), in which the exposure time is changed among the driving conditions of the image sensor 162 will be detailed in the following. FIG. 12(a), FIG. 12(b) and FIG. 12(c) are explanatory drawings for explaining the method for establishing the parameters when the exposure time is changed. FIG. 12(a) shows a graph of the photoelectric conversion characteristic same as that shown in FIG. 6(a), indicating two characteristic line examples of characteristics D, E, both of which include linear characteristic sections D1, E1 and logarithmic characteristic sections D2, E2. Further, numeral E3 indicates a converted characteristic section, which is converted to a logarithmic characteristic from a characteristic section E1 of the characteristic E set as a reference characteristic among them.

Numerals Th200 and Th201 indicate the photoelectric conversion outputs (namely, digital captured-image data 163a) at the inflection points of the characteristics D and E, respectively, while, numeral L200 and L201 indicate the sensor surface illuminances L, respectively. The portion greater than the photoelectric conversion output Th201 of the logarithmic characteristic sections D2 of the characteristic D is the same as the logarithmic characteristic sections E2 of the characteristic E, while, the portion from Th200 to Th201 is the same as the converted characteristic section E3 of the characteristic E.

Figure 12:
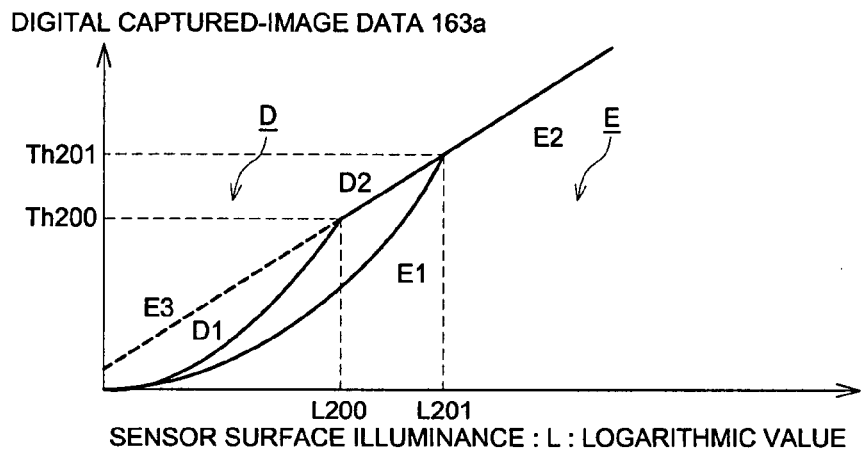
FIG. 12(a), FIG. 12(b) and FIG. 12(c) are explanatory drawings for explaining a method for establishing parameters when an exposure time is changed.
Figure 12:
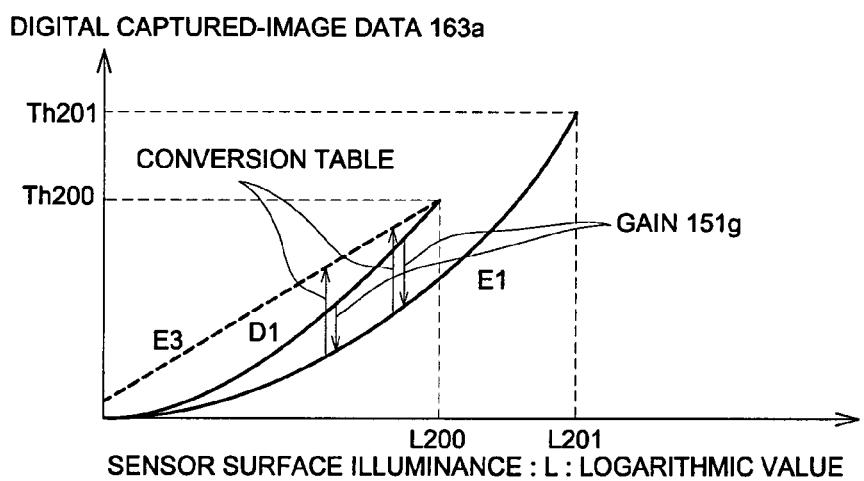
Figure 12:
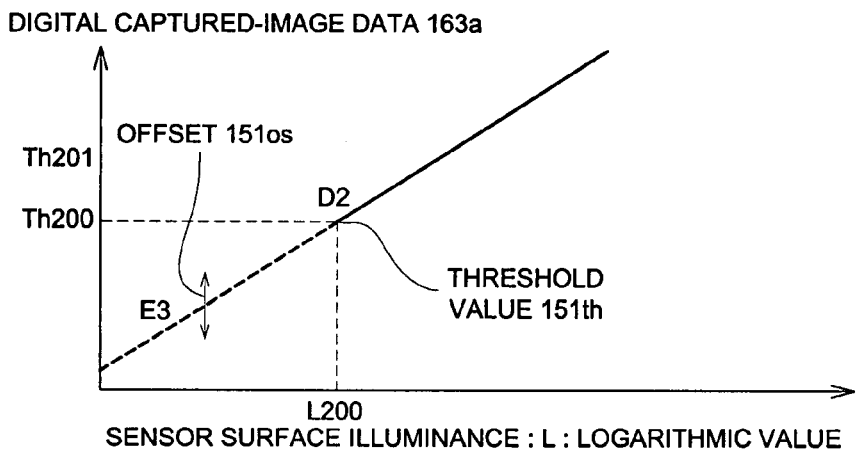

The procedure for converting the characteristic D is indicated in FIG. 12(*b*) and FIG. 12(*c*). At first, as shown in FIG. 12(*b*), the linear characteristic section D1 is multiplied by the gain 151*g*, so as to coincide it with the linear characteristic section E1. The gain 151*g* is equal to a value derived by dividing the value of the linear characteristic section E1 at the same sensor surface illuminance L by the linear characteristic section D1. As a result of the abovementioned conversion, the linear characteristic section D1 coincides with the portion equal to or smaller than the sensor surface illuminance L=L200 of the linear characteristic section E1. Then, the linear characteristic section E1 after conversion is further converted to the converted characteristic section E3. This conversion is stored in the LUT 213 as the conversion table.

In FIG. 12(*c*), since the converted characteristic section E3 is the same as the logarithmic characteristic section D2 of the characteristic D, the offset 151*os* for making the converted characteristic section E3 coincide with the logarithmic characteristic section D2 of the characteristic D is equal to zero. Further, since the portion of the characteristic D equal to or greater than Th200 is the same as the converted characteristic section E3, namely, the reference logarithmic characteristic section E2, the threshold value 151*th*, indicating the changeover point at which the converted characteristic section E3 being the logarithmic characteristic converted from the linear characteristic section D1 of the characteristic D, and the logarithmic characteristic section D2 of the characteristic D are outputted as they are, is equal to Th200. By setting the three parameters of the threshold value 151*th*, gain 151*g* and the offset 151*os* according to the procedure mentioned in the above, the gradation conversion processing when the exposure time is changed, can be conducted.

Next, referring to FIG. 13(*a*), FIG. 13(*b*) and FIG. 13(*c*), the case in which the level of the inflection point is changed among the driving conditions of the image sensor 162 will be detailed in the following. FIG. 13(*a*), FIG. 13(*b*) and FIG. 13(*c*) are explanatory drawings for explaining the method for establishing the parameters when the level of the inflection point is changed. FIG. 13(*a*) shows a graph of the photoelectric conversion characteristic same as that shown in FIG. 6(*b*), indicating two characteristic line examples of characteristics K, M, both of which include linear characteristic sections K1, M1 and logarithmic characteristic sections K2, M2. Further, numeral M3 indicates a converted characteristic section, which is converted to a logarithmic characteristic from a linear characteristic section M1 of the characteristic M set as a reference characteristic among them.

Numerals Th400 and Th401 indicate the photoelectric conversion outputs (namely, digital captured-image data 163*a*) at the inflection points of the characteristics K and M, respectively, while, numeral L400 and L401 indicate the sensor surface illuminance L of the characteristics K, M at Th400 and the other sensor surface illuminance L of the characteristic K at Th401, respectively. The logarithmic characteristic section K2 of the characteristic K is in parallel to the logarithmic characteristic section M2 of the characteristic M.

The procedure for converting the characteristic K is indicated in FIG. 13(*b*) and FIG. 13(*c*). At first, as shown in FIG. 13(*b*), since the linear characteristic sections K1 and M1 are the same relative to each other, the gain 151*g* is equal to 1.0. Accordingly, the linear characteristic section K1 (=M1) is converted to the converted characteristic section M3. This conversion is stored in the LUT 213 as the conversion table.

In FIG. 13(*c*), since the converted characteristic section M3 is in parallel to the logarithmic characteristic section K2 of the characteristic K, the offset 151*os* for making the converted characteristic section M3 coincide with the logarithmic characteristic section K2 of the characteristic K is equal to a differential value between the logarithmic characteristic section K2 and the converted characteristic section M3. Hereinafter, a characteristic derived by adding the offset 151*os* to the converted characteristic section M3 is defined as a converted characteristic section K3. As a result of the abovementioned conversion, the logarithmic characteristic section K2 and the converted characteristic section K3 become same as each other, and the threshold value 151*th*, indicating the changeover point at which the converted characteristic section K3 being the logarithmic characteristic converted from the linear characteristic section K1 of the characteristic K, and the logarithmic characteristic section K2 of the characteristic K are outputted as they are, is equal to Th401. By setting the three parameters of the threshold value 151*th*, gain 151*g* and the offset 151*os* according to the procedure mentioned in the above, the gradation conversion processing when the level of the inflection point is changed, can be conducted.

Next, referring to FIGS. 14-17(*c*), (B) a processing for unifying the photoelectric conversion characteristic after conversion into the linear characteristic of the image sensor 162 so as to output the processed image data having the linear characteristic, will be detailed in the following.

FIG. 10 shows a circuit block diagram of a configuration of the characteristic converting section 200 for conducting (B) a processing for unifying the photoelectric conversion characteristic after conversion into the linear characteristic of the image sensor 162 so as to output the processed image data having the linear characteristic. This configuration indicates an example of the hardware, which conducts the characteristic conversion processing detailed in the foregoing with reference to FIG. 9.

Figure 14:
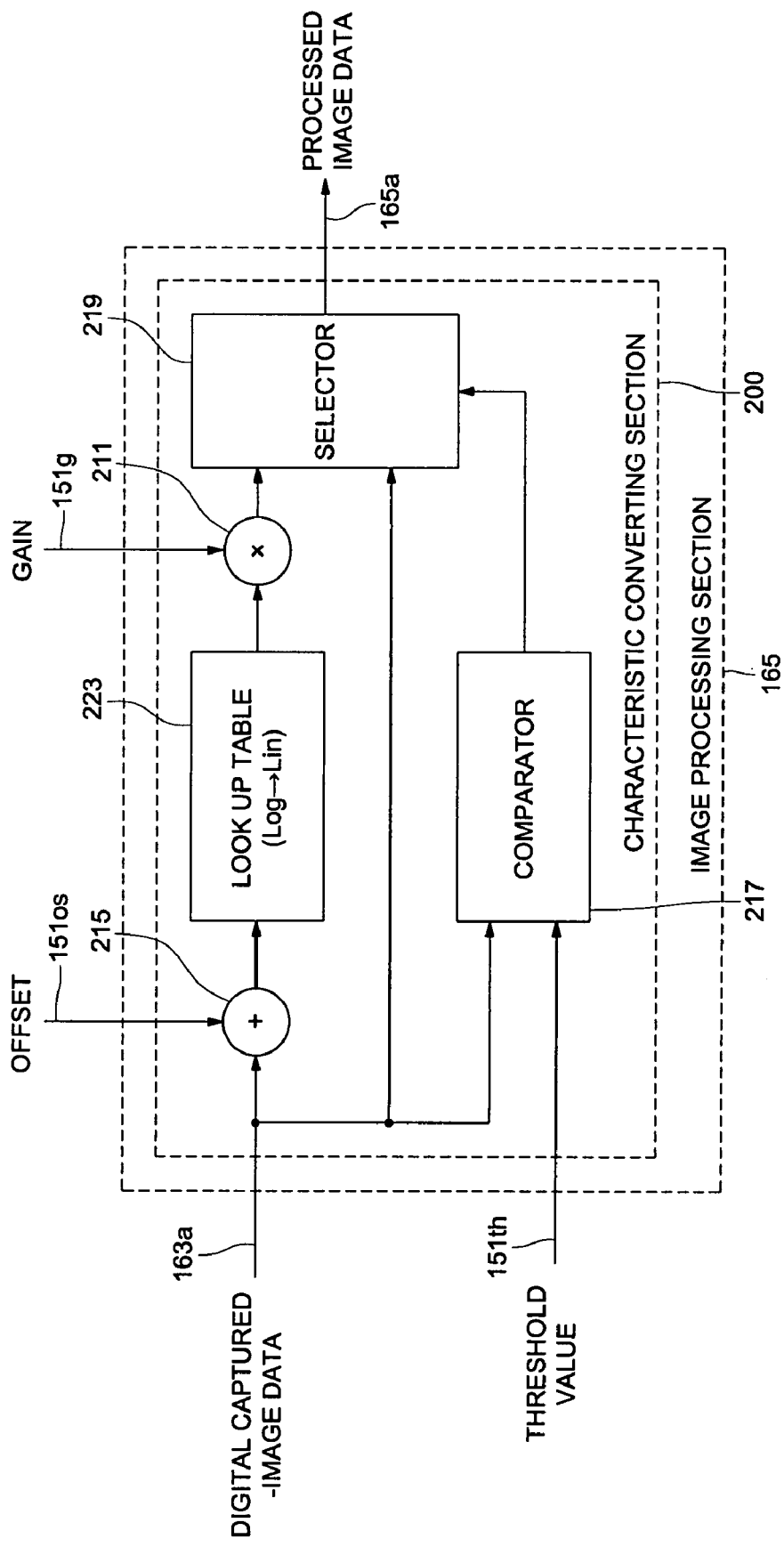
FIG. 14 shows a circuit block diagram of a configuration of a characteristic converting section for conducting a processing for unifying the photoelectric conversion characteristic after gradation conversion processing into a linear characteristic of an image sensor so as to output processed image data having a linear characteristic.

As shown in FIG. 14 as well as shown in FIG. 10, the characteristic converting section 200 is constituted by the multiplier 211, a LUT (Look Up Table) 223, the adder 215, the comparator 217 and the selector 219, and receives the digital captured-image data 163*a* sent from the A/D converter 163, the threshold value 151*th*, the gain 151*g* and the offset 151*os* sent from the control section 151, and outputs the processed image data 165*a*.

The digital captured-image data 163*a* inputted into the characteristic converting section 200 are further inputted into the adder 215, in which an addition processing is applied to the digital captured-image data 163*a* by employing the offset 151*os* established in the control section 151, and then, the processed digital captured-image data 163*a* are outputted to the LUT 223, in which the characteristic conversion processing from the logarithmic characteristic to the linear characteristic is further applied to them. The LUT 213 includes memory sections, in order to output the conversion data stored in one of the memory sections having an address designated by the value of the inputted data. The conversion table, which is converted from the reference logarithmic characteristic to the reference linear characteristic, is inputted into the conversion data.

The multiplier 211 applies a multiplication processing to the data of the reference linear characteristic outputted from the LUT 223 by employing the gain 151*g* established in the control section 151. The reference linear characteristic data multiplied with the gain and outputted from the multiplier 211 are inputted into the selector 219. Further, the digital captured-image data 163*a* are also inputted into the selector 219. On the other hand, both the threshold value 151*th* established by the control section 151 and the digital captured-image data 163a are inputted into the comparator 217, which outputs the comparison result between them to the selector 219.

Based on the comparison result inputted from the comparator 217, the selector 219 outputs the digital captured-image data 163a as the processed image data 165a when the value of the digital captured-image data 163a is smaller than the threshold value 151th (linear characteristic region), while the selector 219 outputs the reference linear characteristic data multiplied with the gain and outputted from the multiplier 211 as the processed image data 165a when the value of the digital captured-image data 163a is equal to or greater than the threshold value 151th (logarithmic characteristic region).

Next, referring to FIG. 15, the method for creating the conversion table, stored in the LUT 223 shown in FIG. 14, will be detailed in the following. As well as the first and second embodiments, the default conversion tables are created and stored into the LUT 223 at the time of, for instance, the shipping adjustment (or the final adjustment before shipment) of the image capturing apparatus 1. The adjustment procedures will be detailed in the following.

(1) PROCESS FOR MEASURING THE PHOTOELECTRIC CONVERSION CHARACTERISTIC: the same process as that of the first and second embodiments can be also applied to the third embodiment. Accordingly, the explanations for it are omitted.

Figure 15:
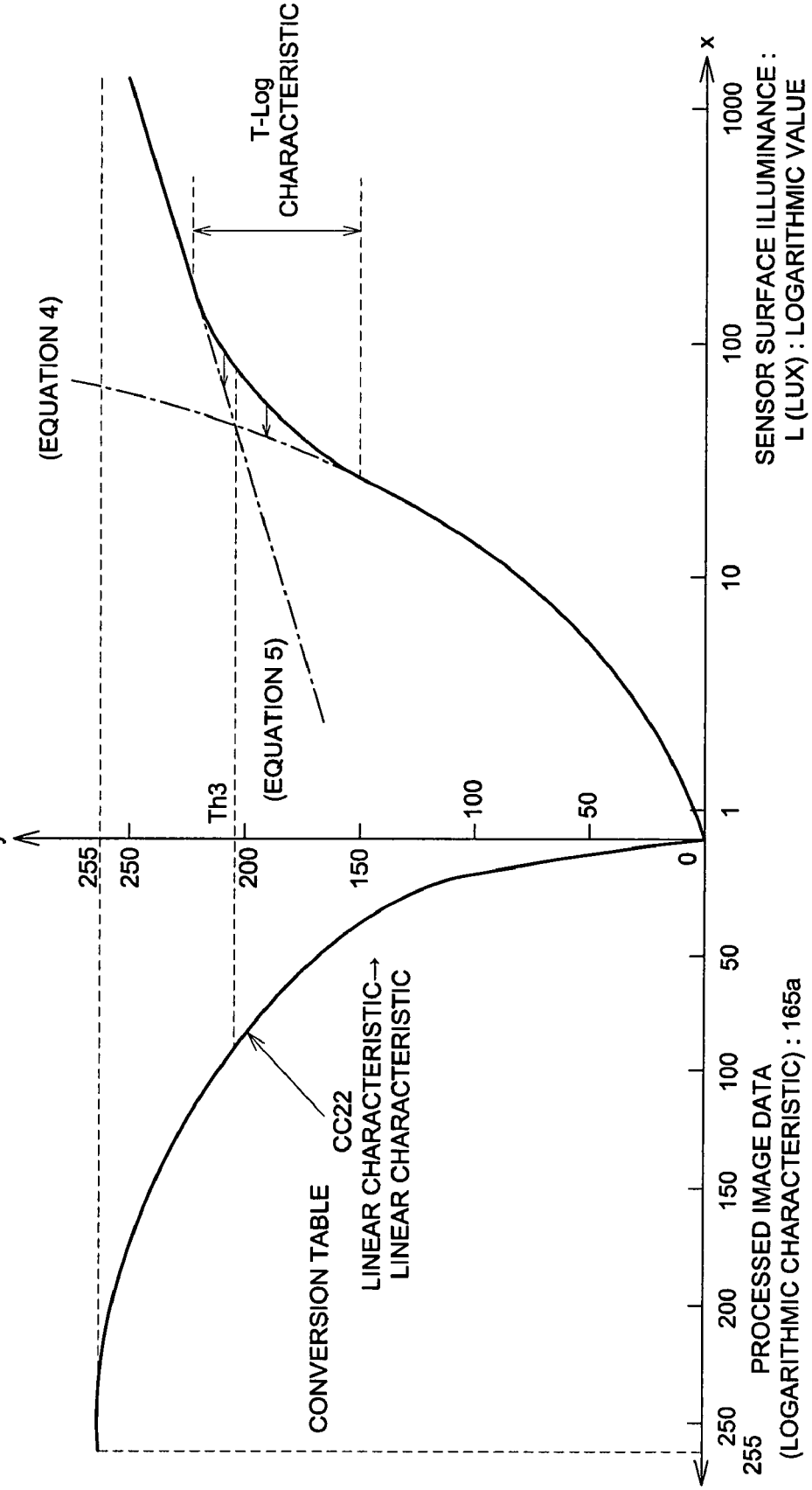
FIG. 15 shows a graph in which a conversion table, for converting digital captured-image data to processed image data having the linear characteristic, is added to the graph shown in FIG. 7.

(2) PROCESS FOR CREATING THE CONVERSION TABLE: the conversion table to be stored into the LUT 223 shown in FIG. 14 is shown in FIG. 15. As well as FIG. 9, FIG. 15 shows a graph in which the conversion table, for converting the digital captured-image data 163a to the processed image data 165a having the linear characteristic, is added to the graph shown in FIG. 7. This conversion table includes only a conversion characteristic CC22 in which the Equations 5 and 4 are employed for input and output characteristics, respectively. Further, in this third embodiment, only the conversion table from the linear characteristic to the logarithmic characteristic under a driving condition to be reference among the driving conditions of the image sensor 162 (the exposure time and the level of the inflection point) is created, and, by employing the characteristic converting section 200 shown in FIG. 14, the logarithmic portion of the digital captured-image data 163a is converted according to the Equation 5, and then, further converted according to the Equation 4 to output the converted data.

Next, referring to FIG. 15, FIG. 16(a), FIG. 16(b) and FIG. 16(c), the method for establishing the three parameters, including the threshold value 151th, the gain 151g and the offset 151os, will be detailed in the following. The above-mentioned three parameters vary depending on the driving condition of the image sensor 162 (the exposure time and the level of the inflection point).

At first, referring to FIG. 16(a), FIG. 16(b) and FIG. 16(c), the case, shown in FIG. 6(a), in which the exposure time is changed among the driving conditions of the image sensor 162 will be detailed in the following. FIG. 16(a), FIG. 16(b) and FIG. 16(c) are explanatory drawings for explaining the method for establishing the parameters when the exposure time is changed. FIG. 16(a) shows a graph of the photoelectric conversion characteristic same as that shown in FIG. 6(a), indicating two characteristic line examples of characteristics D, E, both of which include linear characteristic sections D1, E1 and logarithmic characteristic sections D2, E2. Further, numeral E4 indicates a converted characteristic section, which is converted to a linear characteristic from a logarithmic characteristic section E1 and its extended line of the characteristic E set as a reference characteristic among them.

Numerals Th200 and Th201 indicate the photoelectric conversion outputs (namely, digital captured-image data 163a) at the inflection points of the characteristics D and E, respectively, while, numeral L200 and L201 indicate the sensor surface illuminances L, respectively.

The procedure for converting the characteristic D is indicated in FIG. 16(b) and FIG. 16(c). At first, as shown in FIG. 16(b), since the logarithmic characteristic section D2 of the characteristic D and the logarithmic characteristic section E2 of the characteristic E are the same characteristic, the offset 151os is equal to zero. Next, the logarithmic characteristic D2 (=E2) is converted to the converted characteristic section E4. This conversion is stored in the LUT 223 as the conversion table.

In FIG. 16(c), the converted characteristic section E4 is multiplied by the gain 151g for making a value of the converted characteristic section E4 at L200 of the sensor surface illuminance L and a value of the linear characteristic section D1 at L200 of the sensor surface illuminance L coincide with each other. The gain 151g is equal to a value derived by dividing the value of the linear characteristic section D1 at L200 of the sensor surface illuminance L by the value of the converted characteristic section E4 at L200 of the sensor surface illuminance L. This linear characteristic after conversion is defined as the converted characteristic section D4. Since the portion of the characteristic D equal to or smaller than Th200 is the linear characteristic section D1, the threshold value 151th, indicating the changeover point at which the converted characteristic section D4 being the linear characteristic converted from the logarithmic characteristic section D2 of the characteristic D, and the linear characteristic section D1 of the characteristic D are outputted as they are, is equal to Th200. By setting the three parameters of the threshold value 151th, gain 151g and the offset 151os according to the procedure mentioned in the above, the gradation conversion processing when the exposure time is changed, can be conducted.

Next, referring to FIG. 17(a), FIG. 17(b) and FIG. 17(c), the case in which the level of the inflection point is changed among the driving conditions of the image sensor 162 will be detailed in the following. FIG. 17(a), FIG. 17(b) and FIG. 17(c) are explanatory drawings for explaining the method for establishing the parameters when the level of the inflection point is changed. FIG. 17(a) shows a graph of the photoelectric conversion characteristic same as that shown in FIG. 6(b), indicating two characteristic line examples of characteristics K, M, both of which include linear characteristic sections K1, M1 and logarithmic characteristic sections K2, M2. Further, numeral M3 indicates a converted characteristic section, which is converted to a logarithmic characteristic from a linear characteristic section M1 of the characteristic M set as a reference characteristic among them.

Numerals Th400 and Th401 indicate the photoelectric conversion outputs (namely, digital captured-image data 163a) at the inflection points of the characteristics K and M, respectively, while, numeral L400 and L401 indicate the sensor surface illuminance L of the characteristics K, M at Th400 and the other sensor surface illuminance L of the characteristic K at Th401, respectively. The logarithmic characteristic section K2 of the characteristic K is in parallel to the logarithmic characteristic section M2 of the characteristic M.

The procedure for converting the characteristic K is indicated in FIG. 17(b) and FIG. 17(c). At first, as shown in FIG. 17(b), since the logarithmic characteristic sections K2 and M2 are in parallel to each other, the logarithmic characteristic section K2 is shifted in a direction parallel to the vertical axis by adding the offset 151os to the logarithmic characteristic section K2, so as to coincide it with the logarithmic characteristic section M2. The offset 151os is defined as a differential value between the logarithmic characteristic sections K2 and M2 at L401 of the sensor surface illuminance L. Next, the logarithmic characteristic M2 is converted to the converted characteristic section M4. This conversion is stored in the LUT 223 as the conversion table.

According to the third embodiment of the present invention described in the foregoing, since the characteristic converting section 200 is structured in hardware, it becomes possible to shorten the arithmetic calculation time for the gradation conversion processing, and accordingly, the characteristic converting section 200 embodied in the present invention is specifically effective for such the case that the gradation conversion processing should be completed within a short time, when the image capturing operation is conducted at a high frame rate, etc.

Next, referring to FIGS. 18-21, the forth embodiment of the present invention will be detailed in the following. In the forth embodiment of the present invention, a circuit for converting the output data after the characteristic conversion processing to an arbitral logarithmic characteristic or an arbitral linear characteristic is added to the third embodiment of the present invention.

Figure 18:
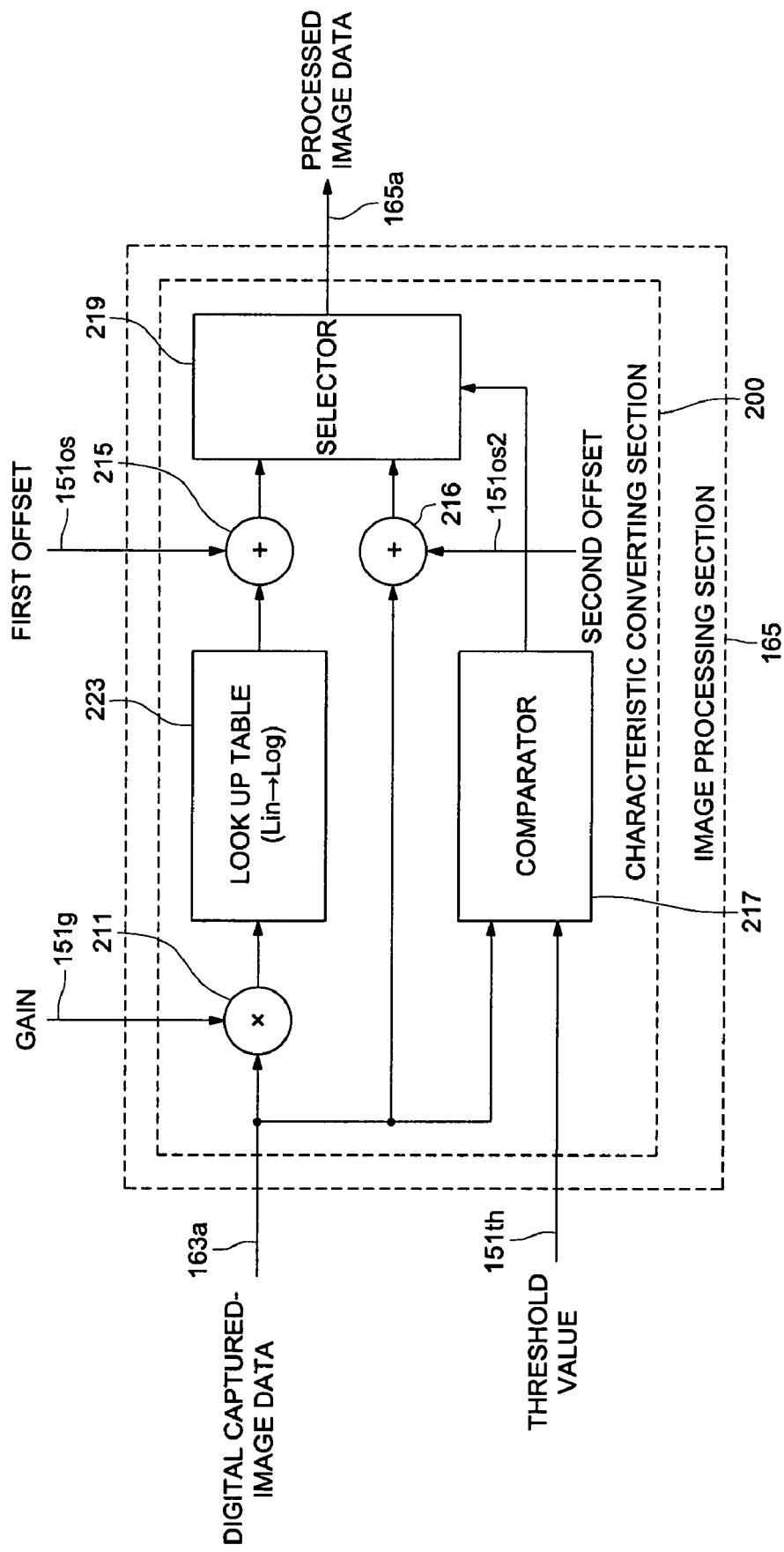
FIG. 18 shows a circuit block diagram of a configuration of a characteristic converting section for conducting a processing for unifying a photoelectric conversion characteristic of data after gradation conversion processing into an arbitral logarithmic characteristic so as to output processed image data having the arbitral logarithmic characteristic.

FIG. 18 shows a circuit block diagram of a configuration of the characteristic converting section 200 for conducting (C) the processing for unifying the photoelectric conversion characteristic of the data after the gradation conversion processing into an arbitral logarithmic characteristic so as to output the processed image data having the arbitral logarithmic characteristic. The circuit block diagram shown in FIG. 18 is the same as that shown in FIG. 10, except that a second adder 216 is disposed at a position in front of the selector 219 so that the digital captured-image data 163a is inputted into the second adder 216 prior to the selector 219. Hereinafter, numeral 151os1 and 151os2 indicate a first offset to be inputted into the adder 215 and a second offset to be inputted into the second adder 216, respectively.

Figure 19:
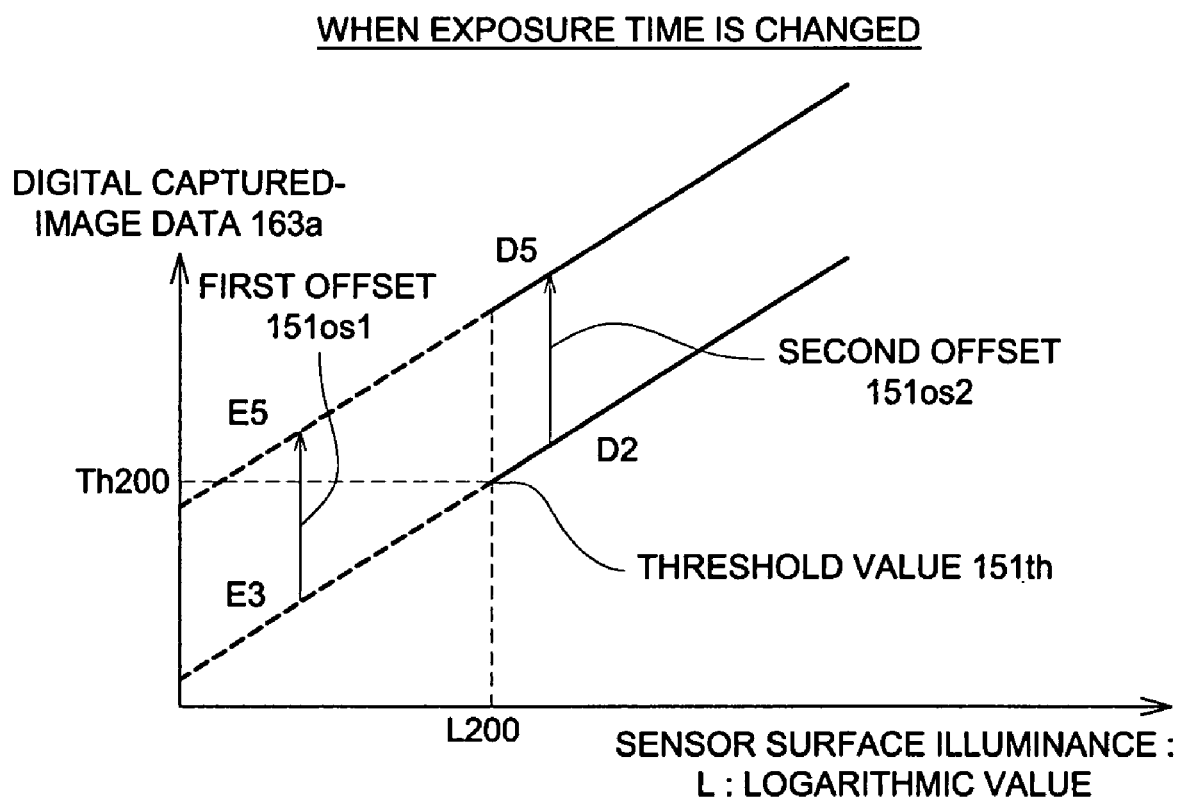
FIG. 19 is an explanatory drawing for explaining a method for establishing parameters when an exposure time is changed.

As shown in FIG. 19, according to the abovementioned configuration, for instance, in the characteristic conversion processing when the exposure time is changed, as shown in FIG. 12(c), by adding the first offset 151os1 to the converted characteristic section E3 whose characteristic is converted by the LUT 213 by employing the adder 215 in order to convert the converted characteristic section E3 to the converted characteristic section E5, and by adding the second offset 151os2 (=the first offset 151os1, being the same value as that inputted into the adder 215) to the digital captured-image data 163a by employing the second adder 216 in order to convert the logarithmic characteristic section D2 to the converted characteristic section D5, it becomes possible to conduct the gradation conversion processing to the arbitral logarithmic characteristic. The same process as mentioned in the above can be applied for the case of changing the level of the inflection point. Detailed explanations are omitted herein.

Figure 20:
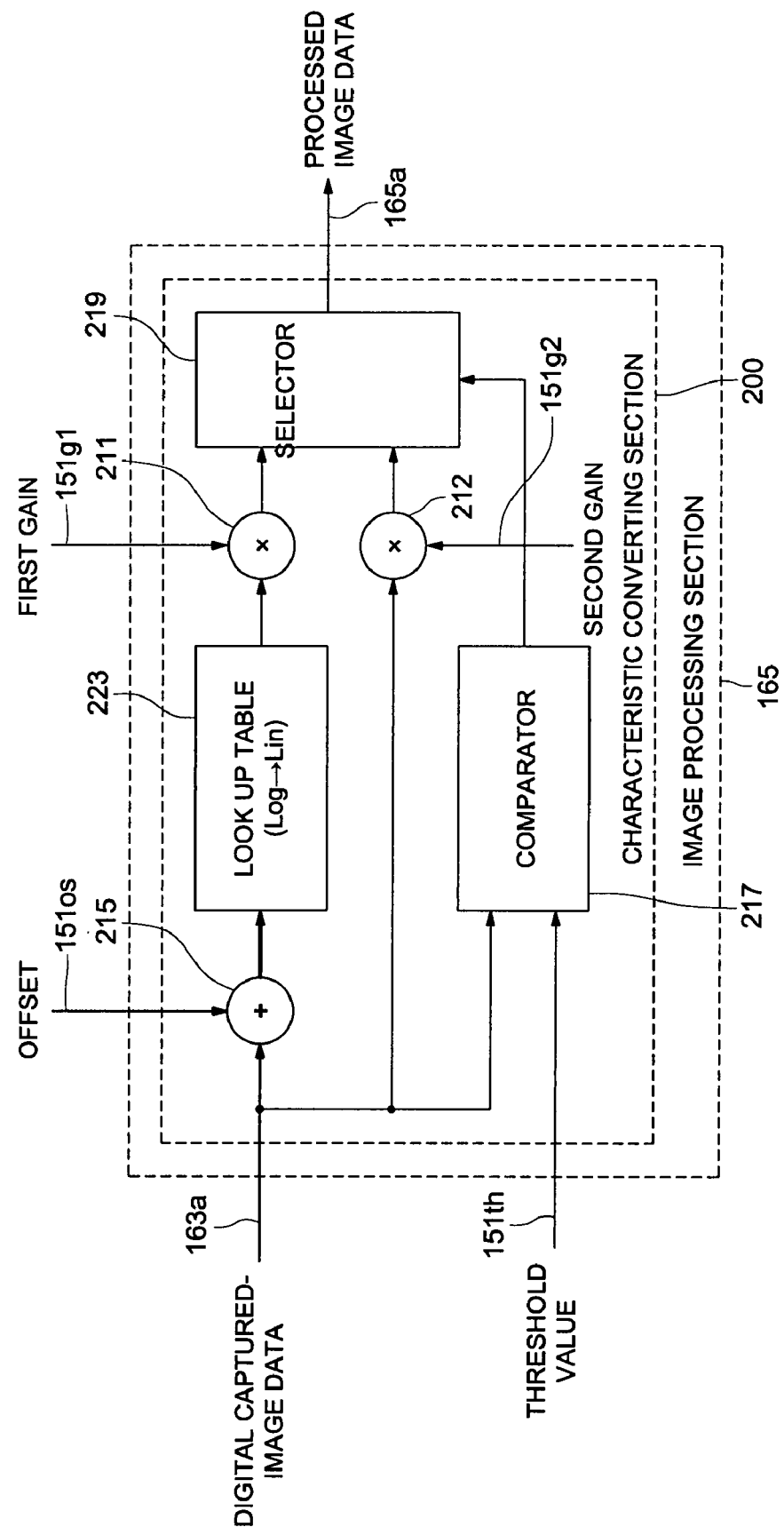
FIG. 20 shows a circuit block diagram of a configuration of a characteristic converting section for conducting a processing for unifying a photoelectric conversion characteristic of data after gradation conversion processing into an arbitral linear characteristic so as to output processed image data having the arbitral linear characteristic.

FIG. 20 shows a circuit block diagram of a configuration of the characteristic converting section 200 for conducting (D) the processing for unifying the photoelectric conversion characteristic of the data after the gradation conversion processing into an arbitral linear characteristic so as to output the processed image data having the arbitral linear characteristic. The circuit block diagram shown in FIG. 20 is the same as that shown in FIG. 14, except that a second multiplier 212 is disposed at a position in front of the selector 219 so that the digital captured-image data 163a is inputted into the second multiplier 212 prior to the selector 219. Hereinafter, numeral 151g1 and 151g2 indicate a first gain to be inputted into the multiplier 211 and a second gain to be inputted into the second multiplier 212, respectively.

Figure 21:
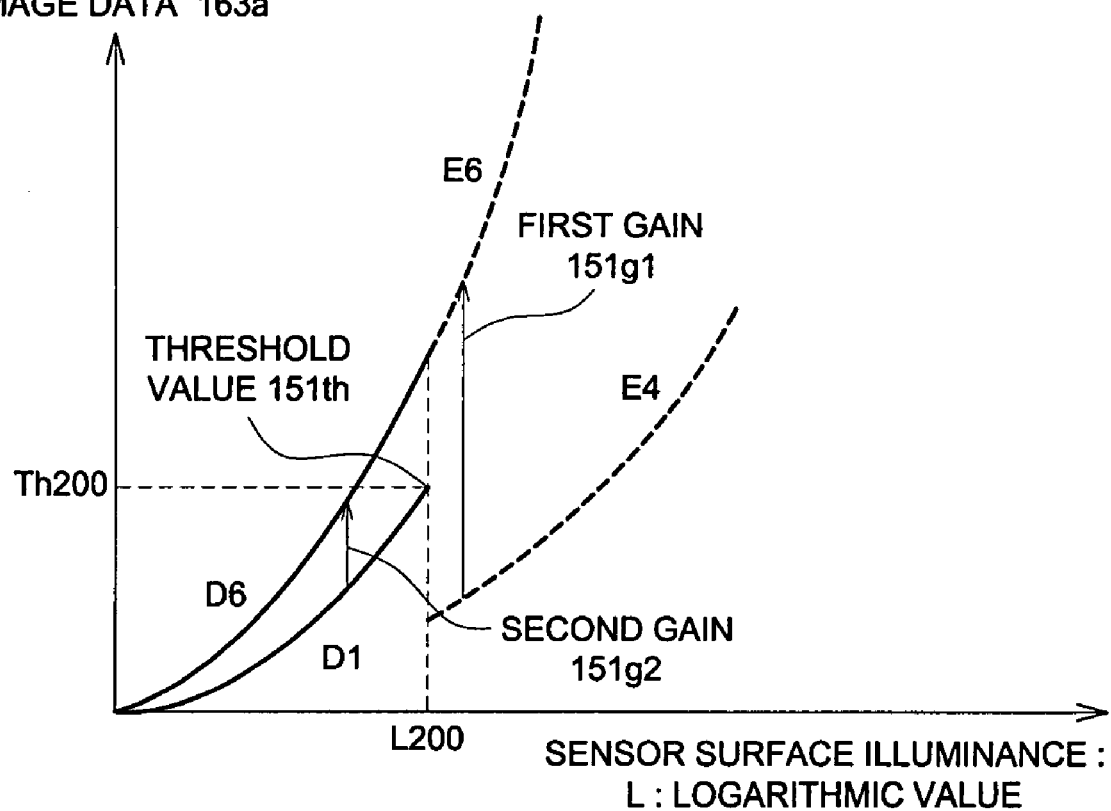
FIG. 21 is an explanatory drawing for explaining a method for establishing parameters when an exposure time is changed.

As shown in FIG. 21, according to the abovementioned configuration, for instance, in the characteristic conversion processing when the exposure time is changed, as shown in FIG. 16(c), by multiplying the digital captured-image data 163a by the second gain 151g2 by employing the second multiplier 212 in order to convert the linear characteristic section D1 to the converted characteristic section D6, and by multiplying the converted characteristic section E4, whose characteristic is converted by the LUT 223, by the first gain 151g1, which makes the output value of the converted characteristic section E4 at L200 of the sensor surface illuminance L equal to the output value of the converted characteristic section D6 at L200 of the sensor surface illuminance L by employing the multiplier 211 in order to convert the converted characteristic section E4 to the converted characteristic section E6, it becomes possible to conduct the gradation conversion processing to the arbitral linear characteristic. The same process as mentioned in the above can be applied for the case of changing the level of the inflection point. Detailed explanations are omitted herein.

According to the forth embodiment of the present invention described in the foregoing, in addition to the features of the third embodiment, since the gradation conversion processing to the arbitral logarithmic characteristic or the arbitral linear characteristic can be conducted, it becomes possible to freely conduct not only the gradation conversion processing matching with the reproducibility of the image reproducing system, such as a display system, a printing system, etc., without being limited by the characteristics of the image sensor 162, but also such the processing for enhancing the gradation characteristic of the desired portion of the image.

As described in the foregoing, according to the present invention, in the image capturing apparatus including an image sensor that is provided with a first photoelectric conversion characteristic, a second photoelectric conversion characteristic being different from the first photoelectric conversion characteristic and a third photoelectric conversion characteristic being a transient characteristic between the first photoelectric conversion characteristic and the second photoelectric conversion characteristic, since the image capturing apparatus further includes a characteristic converting section to convert the first photoelectric conversion characteristic, the second photoelectric conversion characteristic and the third photoelectric conversion characteristic to a reference photoelectric conversion characteristic and the gradation conversion processing is applied to the first photoelectric conversion characteristic, the second photoelectric conversion characteristic and the third photoelectric conversion characteristic, it becomes possible to provide an image capturing apparatus in which the gradation characteristics all over the captured image are unified into the same characteristic.

Incidentally, the image capturing apparatus proper and the detailed configurations and the detailed operations of each of the structural elements constituting the image capturing apparatus, embodied in the present invention, can be varied by a skilled person without departing from the spirit and scope of the invention.

While the preferred embodiments of the present invention have been described using specific term, such description is for illustrative purpose only, and it is to be understood that changes and variations may be made without departing from the spirit and scope of the appended claims.

What is claimed is:

1. An image capturing apparatus, comprising:
an image sensor that is provided with a first photoelectric conversion characteristic corresponding to a lower range of luminance intensity, a second photoelectric conversion characteristic being different from the first photoelectric conversion characteristic corresponding to a higher range of luminance intensity, and a third photoelectric conversion characteristic being different from the first and second photoelectric conversion characteristics, said third photoelectric conversion characteristic being a transient characteristic corresponding to a range of luminance intensity between the first photoelectric conversion characteristic and the second photoelectric conversion characteristic; and
a characteristic converting section to convert the first photoelectric conversion characteristic, the second photoelectric conversion characteristic and the third photoelectric conversion characteristic to a reference photoelectric conversion characteristic.

2. The image capturing apparatus of claim 1,
wherein the first photoelectric conversion characteristic is a linear characteristic, while the second photoelectric conversion characteristic is a logarithmic characteristic.

3. The image capturing apparatus of claim 2,
wherein the reference photoelectric conversion characteristic is a linear characteristic.

4. The image capturing apparatus of claim 2,
wherein the reference photoelectric conversion characteristic is a logarithmic characteristic.

5. The image capturing apparatus of claim 1,
wherein the characteristic converting section converts the third photoelectric conversion characteristic to the reference photoelectric conversion characteristic by employing a method being different from another method for converting the first photoelectric conversion characteristic and the second photoelectric conversion characteristic to the reference photoelectric conversion characteristic.

6. The image capturing apparatus of claim 1,
wherein the characteristic converting section converts the third photoelectric conversion characteristic to the reference photoelectric conversion characteristic, while regarding each of characteristic regions, into which the third photoelectric conversion characteristic is divided at a changeover point, as either the first photoelectric conversion characteristic or the second photoelectric conversion characteristic.

7. The image capturing apparatus of claim 5,
wherein the changeover point is defined as an intersection of extended lines of the first photoelectric conversion characteristic and the second photoelectric conversion characteristic.

8. The image capturing apparatus of claim 1,
wherein the characteristic converting section is provided with a look up table including a memory section.

9. The image capturing apparatus of claim 2,
wherein a boundary between the first photoelectric conversion characteristic and the third photoelectric conversion characteristic is set at such a point that is apart from another point, represented by an equation of the first photoelectric conversion characteristic, by a first value being equal to or greater than a first predetermined value, while a boundary between the second photoelectric conversion characteristic and the third photoelectric conversion characteristic is set at such a point that is apart from another point, represented by an equation of the second photoelectric conversion characteristic, by a second value being equal to or greater than a second predetermined value.

10. The image capturing apparatus of claim 9,
wherein the first predetermined value is determined prior to the second predetermined value.

11. The image capturing apparatus of claim 9,
wherein the second predetermined value is smaller than the first predetermined value.

12. An image capturing apparatus, comprising:
an image sensor having a first photoelectric conversion characteristic corresponding to a lower range of luminance intensity, a second photoelectric conversion characteristic being different from the first photoelectric conversion characteristic corresponding to a higher range of luminance intensity, and a third photoelectric conversion characteristic being different from the first and second photoelectric conversion characteristics, said third photoelectric conversion characteristic being a transient characteristic corresponding to a range of luminance intensity between the first photoelectric conversion characteristic and the second photoelectric conversion characteristic;
a characteristic converting section configured to convert the first photoelectric conversion characteristic, the second photoelectric conversion characteristic and the third photoelectric conversion characteristic to a reference photoelectric conversion characteristic, the characteristic converting section including a storage section and a look up table; and
a control section configured to control the output of data from the storage section to the look up table.

13. An image capturing apparatus, comprising:
an image sensor, said image sensor having a plurality of pixels, each pixel having a plurality of transistors and a light sensitive element, said image sensor having a photoelectric response function and being configured to convert the luminance intensity of light on the surface of each of said pixels to an electric signal based on the photoelectric response function; and
a characteristic converting section, said characteristic converting section including a storage section and a look up table, said characteristic converting section being configured to convert the electric signal into processed image data,
wherein the photoelectric response function includes a first photoelectric conversion characteristic corresponding to a lower range of luminance intensity, a second photoelectric conversion characteristic corresponding to a higher range of luminance intensity, and a third photoelectric conversion characteristic corresponding to a range of luminance intensity between the first photoelectric conversion characteristic and the second photoelectric conversion characteristic, with each of said first, second, and third photoelectric conversion characteristics being different from each other.

14. The image capturing apparatus of claim 13,
wherein the first photoelectric conversion characteristic is a linear characteristic, the second photoelectric conversion characteristic is a logarithmic characteristic, and the third photoelectric conversion characteristic provides a transition between the first photoelectric conversion characteristic and the second photoelectric conversion characteristic.

* * * * *